US011042165B2

(12) United States Patent
Heinla et al.

(10) Patent No.: US 11,042,165 B2
(45) Date of Patent: Jun. 22, 2021

(54) MOBILE ROBOT SYSTEM AND METHOD FOR AUTONOMOUS LOCALIZATION USING STRAIGHT LINES EXTRACTED FROM VISUAL IMAGES

(71) Applicant: Starship Technologies OÜ, Tallinn (EE)

(72) Inventors: Ahti Heinla, Tallinn (EE);
Kalle-Rasmus Volkov, Tallinn (EE);
Lindsay Roberts, Tallinn (EE); Indrek Mandre, Tallinn (EE)

(73) Assignee: Starship Technologies OÜ, Tallinn (EE)

( * ) Notice: Subject to any disclaimer, the term of this patent is extended or adjusted under 35 U.S.C. 154(b) by 147 days.

(21) Appl. No.: 16/525,730

(22) Filed: Jul. 30, 2019

(65) Prior Publication Data

US 2019/0354110 A1    Nov. 21, 2019

Related U.S. Application Data

(63) Continuation of application No. 15/968,838, filed on May 2, 2018, now Pat. No. 10,386,850, which is a
(Continued)

(30) Foreign Application Priority Data

Nov. 2, 2015   (EP) .................................. 15192649

(51) Int. Cl.
*G01C 21/00*      (2006.01)
*G05B 15/00*      (2006.01)
(Continued)

(52) U.S. Cl.
CPC .......... *G05D 1/0246* (2013.01); *G01C 21/32* (2013.01); *G05D 1/0088* (2013.01);
(Continued)

(58) Field of Classification Search
CPC ... G05D 1/0223; G05D 1/0274; G05D 1/0246
See application file for complete search history.

(56) References Cited

U.S. PATENT DOCUMENTS 7,015,831 B2   3/2006  Karlsson et al.
7,873,448 B2   1/2011  Takeda et al.
(Continued)

FOREIGN PATENT DOCUMENTS

CN    102435188    5/2012
CN    104166400    11/2014
(Continued)

OTHER PUBLICATIONS

Japanese Office Action dated Dec. 1, 2020, issued in JP counterpart application (No. 2018-519923).
(Continued)

*Primary Examiner* — Adam D Tissot
(74) *Attorney, Agent, or Firm* — Womble Bond Dickinson (US) LLP

(57) ABSTRACT

A mobile delivery robot has at least one memory component containing at least map data; at least two cameras adapted to take visual images; and at least one processing component. The at least one processing component is adapted to at least extract straight lines from the visual images taken by the at least two cameras and compare them to the map data to at least localize the robot. The mobile robot employs a localization method which involves taking visual images with at least two cameras; extracting straight lines from the individual visual images with at least one processing component; comparing the extracted features with existing map data; and outputting a location hypothesis based on said comparison.

23 Claims, 10 Drawing Sheets

Related U.S. Application Data continuation of application No. PCT/EP2016/076467, filed on Nov. 2, 2016.

(51) Int. Cl.

| | | |
|---|---|---|
| *G05D 1/02* | (2020.01) | |
| *G06T 7/579* | (2017.01) | |
| *G06T 7/73* | (2017.01) | |
| *G06T 7/00* | (2017.01) | |
| *G01C 21/32* | (2006.01) | |
| *G05D 1/00* | (2006.01) | |
| *G06Q 10/08* | (2012.01) | |

(52) U.S. Cl.
CPC ......... *G05D 1/0212* (2013.01); *G05D 1/0223* (2013.01); *G05D 1/0251* (2013.01); *G05D 1/0274* (2013.01); *G06Q 10/0833* (2013.01); *G06T 7/579* (2017.01); *G06T 7/73* (2017.01); *G06T 7/97* (2017.01); *G05D 1/024* (2013.01); *G05D 1/027* (2013.01); *G05D 1/0255* (2013.01); *G05D 1/0272* (2013.01); *G05D 1/0278* (2013.01); *G05D 2201/0213* (2013.01); *G05D 2201/0216* (2013.01); *G06T 2207/10004* (2013.01); *G06T 2207/10016* (2013.01); *G06T 2207/20212* (2013.01); *G06T 2207/30244* (2013.01); *G06T 2207/30252* (2013.01)

(56) References Cited

U.S. PATENT DOCUMENTS

| | | |
|---|---|---|
| 8,305,430 B2 | 11/2012 | Oskiper et al. |
| 8,717,545 B2 | 5/2014 | Sebastian et al. |
| 9,317,037 B2* | 4/2016 | Byford ................ G05D 1/0231 |
| 2003/0081564 A1 | 5/2003 | Chan |
| 2005/0117781 A1* | 6/2005 | Aoyama ............. G06K 9/4633 382/103 |
| 2005/0182518 A1* | 8/2005 | Karlsson .............. G05D 1/0246 700/253 |
| 2006/0293810 A1 | 12/2006 | Nakamoto |
| 2007/0115352 A1 | 5/2007 | Oskiper et al. |
| 2007/0156286 A1 | 7/2007 | Yamauchi |
| 2008/0119961 A1* | 5/2008 | Myeong ............... G05D 1/0272 700/262 |
| 2009/0024251 A1 | 1/2009 | Myeong et al. |
| 2009/0154791 A1 | 6/2009 | Yoon et al. |
| 2010/0001991 A1 | 1/2010 | Jeong et al. |
| 2010/0188510 A1 | 7/2010 | Yoo et al. |
| 2010/0280754 A1 | 11/2010 | Goncalves et al. |
| 2010/0305854 A1* | 12/2010 | Kammel ............. A01D 34/008 701/469 |
| 2011/0091096 A1 | 4/2011 | Morris et al. |
| 2011/0206274 A1 | 8/2011 | Tateno et al. |
| 2013/0201358 A1 | 8/2013 | Sun |
| 2014/0125700 A1 | 5/2014 | Ramachandran et al. |
| 2015/0185025 A1 | 7/2015 | Lacaze et al. |
| 2015/0202770 A1 | 7/2015 | Patron et al. |
| 2015/0212521 A1 | 7/2015 | Pack et al. |
| 2015/0253777 A1 | 9/2015 | Binney et al. |
| 2015/0314443 A1 | 11/2015 | Yu |
| 2016/0025502 A1 | 1/2016 | Lacaze et al. |
| 2016/0068156 A1 | 3/2016 | Horii |
| 2016/0147230 A1 | 5/2016 | Munich et al. |
| 2017/0097643 A1 | 4/2017 | Munich et al. |
| 2017/0108867 A1 | 4/2017 | Franzius et al. |

FOREIGN PATENT DOCUMENTS

| | | |
|---|---|---|
| CN | 104851094 | 8/2015 |
| JP | 2011-209203 A | 10/2011 |
| WO | WO 99/30270 | 6/1999 |

OTHER PUBLICATIONS

Ben Ghorbel et al., "3D Head Pose Estimation and Tracking Using Particle Filtering and ICP Algorithm," In: Perales F.J., Fisher R.B. (eds) Articulated Motion and Deformable Objects, AMDO 2010, Lecture Notes in Computer Science, 6169:224-237, Springer, Berlin, Heidelberg.

Gaspar et al., "Vision-based Navigation and Environmental Representations with an Omni-directional Camera," IEEE Transactions on Robotics and Automation (Dec. 2000) vol. 16, No. 6, pp. 890-898.

Hafez et al., "Particle-filter-based Pose Estimation from Controlled Motion with Application to Visual Servoing," Int J Adv Syst, 2014, 11(10):177 (12 pp).

Lee et al., "Automatic Edge Detection Method for the Mobile Robot Application," IEEE/RJS, Intl Conf on Intelligent Robots and Systems, Oct. 2003, 3:2730-2735.

Murillo et al., "From omnidirectional images to hierarchical localization," Robotics and Autonomous Systems 55 (Dec. 2007) No. 5, pp. 372-382.

Schindler et al., "Line-Based Structure From Motion for Urban Environments," Georgia Institute of Technology College of Computing (2006) pp. 1-8.

Yuen et al., "Vision-based localization algorithm based on landmark matching, triangulation, reconstruction, and comparision," IEEE Transactions on Robotics (Apr. 2005) vol. 21, No. 2, pp. 217-226.

Office action dated May 22, 2019, issued in EP counterpart patent application (No. 16798097.8).

Office action dated Aug. 15, 2018, issued in (U.S. Appl. No. 15/968,802).

Final office action dated May 28, 2019, issued in (U.S. Appl. No. 15/968,802).

International Search Report dated Feb. 1, 2017, issued in PCT counterpart application (No. PCT/EP2016/076467).

Written Opinion dated Feb. 1, 2017, issued in PCT counterpart application (No. PCT/EP2016/076467).

Chinese Office Action dated Sep. 21, 2020, issued in CN counterpart application (No. 201680062503.9).

* cited by examiner

MOBILE ROBOT SYSTEM AND METHOD FOR AUTONOMOUS LOCALIZATION USING STRAIGHT LINES EXTRACTED FROM VISUAL IMAGES

RELATED APPLICATIONS

This is a Continuation of U.S. patent application Ser. No. 15/968,838 filed May 2, 2018, now U.S. Pat. No. 10,386,850, which is a Bypass Continuation of International Application No. PCT/EP2016/076467, filed Nov. 2, 2016 and published as WO 2017/076929A1, which claims priority to European Patent Application no. EP 15192649.0, filed Nov. 2, 2015. The contents of the aforementioned applications are incorporated by reference in their entirety.

FIELD

The invention relates to localization performed by a moving robot. More particularly, the invention relates to localization using multiple cameras taking visual images.

BACKGROUND

Localization of mobile robots has been an active area of research since progress in robotics allowed for semi-autonomous and autonomous robots. A moving robot must have a method of at least estimating its position in space to continue motion with a purpose. To estimate its position, the robot must use some sort of a map on which it can place itself. Such a map can be preloaded on a robot, or it can be obtained by the robot itself. In the latter case, the map can be obtained simultaneously with the robot localization, or it can first be developed to be used later as part of localization. The modern framework of localization comprises a coordinate system with respect to which the localization is done and a pose, which is a combination of position and orientation. Localization can be done with respect to an absolute coordinate system (such as GPS coordinates) or a relative coordinate system (such as localization with respect to some known location and/or object). The coordinate system can be chosen arbitrarily, as long as it is consistent and can be converted to some standard coordinate system (such as WGS84) if needed.

Multiple sensor readings can contribute to pose calculation—it can be determined using GPS receivers, Lidar (light radar) sensors, cameras, odometers, gyroscopes, accelerometers, magnetometers, time of flight cameras and radar sensors. There is an important distinction to be made in the context of localization: it can be done based on an existing map, or it can be done simultaneously with mapping. The latter is called SLAM (Simultaneous Localization and Mapping) and is the preferred approach when localization is performed while exploring previously unknown surroundings. If a map is already available, the task becomes easier. For example, localization in indoor environments (such as an apartment or a hospital) or structured outdoor environments (such as a factory complex) is easier, since a detailed map is readily available, and it is unlikely to change significantly in the short term. Localization outdoors, in unstructured environments (such as cities, suburbs and/or villages) is a greater challenge. First, publicly available maps are not precise enough for autonomous motion by the robot. Second, even when the maps exist, they are likely to get outdated very fast, as new obstacles appear and old pathways disappear. Localization outdoors can be done with the help of a positioning system such as GPS (Global Positioning System), GLONASS (Global Navigation Satellite System) or Galileo. However, the precision of these systems (available for public use) is on the order of 1-10 meters. This would not be enough for localization used for autonomous robotic navigation.

Existing solutions to the localization problem strongly depend on the intended application of the object to be localized.

U.S. Pat. No. 8,717,545 B2 discloses a system using range and Doppler velocity measurements from a lidar system and images from a video system to estimate a six degree-of-freedom trajectory of a target. Once the motion aspects of the target are estimated, a three-dimensional image of the target may be generated.

U.S. Pat. No. 7,015,831 B2 discloses a method and apparatus that use a visual sensor and dead reckoning sensors to process Simultaneous Localization and Mapping (SLAM). Advantageously, such visual techniques can be used to autonomously generate and update a map. Unlike with laser rangefinders, the visual techniques are economically practical in a wide range of applications and can be used in relatively dynamic environments, such as environments in which people move. The disclosed method can be implemented in an automatic vacuum cleaner operating in an indoor environment.

U.S. Pat. No. 8,305,430 B2 discloses a visual odometry system and method for a fixed or known calibration of an arbitrary number of cameras in monocular configuration. Images collected from each of the cameras in this distributed aperture system have negligible or absolutely no overlap. The system uses multiple cameras, but generates pose hypothesis in each camera separately before comparing and refining them.

Schindler, et al. (in 3D Data Processing, Visualization, and Transmission, Third International Symposium on, pp. 846-853. IEEE, 2006) discusses a novel method for recovering the 3D-line structure of a scene from multiple widely separated views. In this approach, 2D-lines are automatically detected in images with the assistance of an EM-based vanishing point estimation method which assumes the existence of edges along mutually orthogonal vanishing directions. 3D reconstruction results for urban scenes based on manually established feature correspondences across images are presented.

Murillo, A. C., et al. (Robotics and Autonomous Systems 55, no. 5 (2007): 372-382) proposes a new vision-based method for global robot localization using an omnidirectional camera. Topological and metric localization information are combined in an efficient, hierarchical process, with each step being more complex and accurate than the previous one but evaluating fewer images.

SUMMARY

The present invention is specified in the claims as well as in the below description. Preferred embodiments are particularly specified in the dependent claims and the description of various embodiments.

In a first aspect, the invention provides a mobile robot comprising (i) at least one memory component comprising at least map data, (ii) at least two cameras adapted to take visual images of an environment, and (iii) at least one processing component adapted to at least extract straight lines from the visual images taken by the at least two cameras and compare them to the map data to at least localize the robot.

In a second aspect, a localization method making use of the invention is provided. The localization method can make use of any features of the system described herein. The localization method can comprise taking visual images with at least two cameras. The localization method can also comprise extracting straight lines from the individual visual images with at least one processing component. The method can further comprise comparing the extracted features with existing map data. The method can also comprise outputting a location hypothesis based on the comparison between the extracted features and the map data.

In some embodiments, the localization method can further comprise the steps of outputting a mobile robot pose using the outputted location hypothesis. The method can also comprise navigating a mobile robot using the obtained pose. In some embodiments, the robot can be adapted to navigate itself, i.e. be autonomous and/or semi-autonomous.

In some embodiments, comparing the extracted features and/or straight lines with existing map data and outputting a location hypothesis can comprise using an iterative probabilistic algorithm to determine the best location hypothesis given the stored map data. In some preferred embodiments, a particle filter based algorithm can be used. Using an iterative probabilistic algorithm is particularly advantageous, as both map data and lines extracted from camera images can comprise errors associated with the robot's sensors (such as cameras), and/or associated with the process of generating map data. To process data with its associated errors, it is practical to assign probabilities to different possible outcomes or outputs and treat them iteratively. This can lead to more robust and reliable outputs, increasing the success of the localization method. In another embodiment, the invention provides an assembly of mobile robots comprising at least two mobile robots, and each of the robots comprising (i) at least one memory component comprising at least map data, (ii) at least two cameras adapted to take visual images of an environment, (iii) at least one processing component adapted to at least extract features from the visual images taken by the at least one camera and compare them to the map data to at least localize the robot, (iv) and at least one communication component adapted to send and receive data between the robots, particularly image and/or map data.

In another embodiment, a mapping method making use of the invention is provided. The mapping method can make use of any features of the system listed above and below. The mapping method comprises (i) operating at least one mobile robot comprising at least two cameras and at least one processing component, (ii) taking visual images with the at least one robot's at least two cameras, (iii) performing preprocessing on a file generated by combining visual images from the at least two cameras, (iv) extracting features from the individual visual images with at least one processing component, and (v) building map data using the extracted features from the visual images.

In another embodiment, a localization method making use of the invention is provided. The localization method can make use of any features of the system described herein. The localization method comprises (i) operating at least one mobile robot comprising at least two cameras, at least one memory component, and at least one processing component, (ii) taking visual images with the at least one robot's at least two camera components, (iii) performing preprocessing on a file generated by combining visual images from the at least two cameras, (iv) extracting features from the individual visual images with at least one processing component, (v) comparing the extracted features with existing map data stored on the at least one robot's at least one memory component, and (vi) localizing the at least one robot using the comparison in (v).

In another embodiment, a localization method making use of the invention is provided. The localization method can make use of any features of the system described herein. The method comprises (i) providing at least one mobile robot comprising at least one dead reckoning component, at least two cameras, at least one memory component, and at least one processing component; and (ii) taking visual images with the at least one robot's at least two camera components; and (iii) extracting features from the individual visual images with at least one processing component; and (iv) obtaining location related data from the extracted features in (iii); and (v) receiving location related data from the at least one dead reckoning component; and (vi) combining location related data obtained from the features extracted from the visual images in (iv) and location related data received from the at least one dead reckoning component in (v) weighted based on errors associated with each of them; and (vii) forming a hypothesis on the robot's pose based on the combined data in (vi).

The mobile robot can be an autonomous and/or a semi-autonomous robot. The robot can be land-based. The robot can be adapted to move on the ground. In particular, the robot can be wheeled and adapted to move in unstructured urban areas that include moving and stationary obstacles. In one embodiment, the robot comprises a set of at least 4 (four) wheels mounted on a frame. The robot can further comprise a body mounted on the frame. The robot can further comprise lights mounted on the body and/or on the frame. The lights can be LED lights. The lights can assist the robot with localization and/or navigation on short scales and/or with obstacle detection. The lights can illuminate the environment in which the robot operates in the dark and/or dusk. Additionally or alternatively, the robot can comprise at least one microphone and/or at least one speaker, for communicating with its surrounding, for example pedestrians in an urban area, such as on a pedestrian path.

Cameras and other components described herein can be mounted on the frame and/or on the body of the robot. In one particular embodiment, the dimensions of the robot are width: 40 to 70 cm, such as about 55 cm, height: 40 to 70 cm, such as about 60 cm, length: 50 to 80 cm, such as about 65 cm. The invention can comprise more than one robot. In one embodiment, the robot can operate autonomously during most of its operation, such as about 95% of the time, about 97% of the time, about 98% of the time, or about 99% of the time. The robot can be adapted to travel with a speed of no more than 10 km/h, or no more than 8 km/h or no more than 6 km/h. In a preferred embodiment, the robot drives with a speed between 3 and 6 km/h and/or between 4 and 5 km/h. In a preferred embodiment, the robot can be used for delivery purposes. The robot can comprise an enclosed space within its body where at least one delivery can be stored during the transit. The robot can further comprise a secure access device for providing access to the space. This device can be a lock and/or a closure mechanism controlled by a secure interface. The robot and the delivery can have a combined weight of no more than 40 kg, such as no more than 35 kg, such as no more than 30 kg, such as no more than 25 kg. In a preferred embodiment, the robot and the delivery have a combined weight of 10-25 kg, more preferably 10-20 kg.

The memory component of the mobile robot can comprise a Random Access Memory (RAM) device. It can be a standalone component or, in a preferred embodiment, an integrated part of a System on a Chip (SoC). The memory component preferably stores at least map data that can relate to the robot's current and/or prospective operating area. The operating area, also referred to as area of operation, can be fixed or can be modified during the course of the robot's operation. In a preferred embodiment, the operating area comprises an inhabited region that can consist of a city, a village, a neighbourhood and/or an arbitrarily defined part of a city. The operating area can also comprise regions with standalone human habitations and/or regions frequented by humans.

The map data that can be stored within the memory component can comprise a plurality of vectors, straight lines, point features and/or grid features defined with respect to some coordinate system. The map data can comprise two points and/or a point and a direction defined with respect to an arbitrary but fixed coordinate system. This coordinate system can be tied to the robot, for example with one of the cameras serving as the origin and the direction of motion as the x-axis. The coordinate system can also be independent of the robot, such as a GPS system for example. The coordinate system can be a Cartesian coordinate system approximating such a part of the globe so that the curvature does not introduce significant error. The coordinate system can be converted to a GPS coordinate system (for example WGS84) and/or other standard systems. The map data can also thus be converted to a standard coordinate system such as GPS coordinates. The grid features can comprise extended objects that are not lines, such as, for example, geometrical shapes. For instance, in some embodiments, the street poles can be modelled as geometrical objects with a radius varying with height. These can then be considered grid features. Furthermore, rectangular or substantially rectangular objects can be considered grid features. These can comprise, for example doors, windows and/or other objects. Additionally or alternatively, substantially circular, oval, triangular and differently shaped objects can comprise grid features. The map data can simply comprise a collection of numbers corresponding to the positions of straight lines and/or of physical objects (landmarks) and/or of robot poses with respect to some coordinate system. There can also be a plurality of coordinate systems defined for map data. The map data can further comprise lines obtained on the basis of camera image lines. That is, the lines extracted from camera images can be run through an algorithm to verify whether they belong to actual landmarks (that is, physical objects), and whether some of them can be combined. At this stage, the position of the lines with respect to each other and/or with respect to the robot can be adjusted, as lines extracted from images taken by different cameras and/or taken at different time points can be combined if it is determined that they belong to the same landmarks. Some lines can also be discarded if it is determined that they likely belong to transient objects (such as trucks or cars), light effects and/or camera effects. Map data can then comprise this collection of lines based on the lines extracted from images, but processed by a certain algorithm to comprise mostly or solely lines belonging to landmarks, combined lines, and/or lines with an adjusted position. Map data can further comprise error estimates associated with vectors, point features, and/or lines associated with landmarks. Map data can further comprise visibility information. That is, information about from which locations given landmarks can be seen. In other words, if, for example, a wall would obstruct a landmark or physical object, so that it cannot be seen from locations behind the wall, this information can also be comprised in map data. This is practical, as when, for example, the robot uses the map to navigate, it will not detect landmarks of physical objects that are nearby, but obstructed. The visibility information can also take into account the height of the robot's cameras to determine which object can be visible at which locations.

The cameras on the robot are typically adapted to take visual images of the surrounding environment of the robot within its operating area. Typically, the surrounding environment comprises closely located visual objects, such as objects that are located within a radius of about 1 km or less, 500 m or less, 300 m or less, 200 m or less or 100 m or less from the robot. Accordingly, the robot can be adapted to take and process images of the surroundings of the robot that are within a radius of about 1 km or less, 500 m or less, 300 m or less, 200 m or less or 100 m or less. The environment is typically an unstructured outdoor environment that changes with time and the geographical surroundings of the robots as it travels along its path. The environment can also be at least partially indoor, or under a roof, for example if the robot is travelling through a mall, garage, apartment complex, office buildings, or the like.

The cameras of the mobile robot can be for example similar to smartphone cameras. They can be adapted to capture 1-10 images per second, more preferably 3-5 images per second or more preferably 4 images per second. The camera viewing angles can be 10°-120°, more preferably 40°-100°, more preferably 60° by 80°. The robot can comprise a plurality of cameras. In a preferred embodiment, the robot comprises at least 4 (four) cameras. In a more preferred embodiment, the robot comprises 9 (nine) cameras. The cameras can be placed anywhere around the body of the robot, preferably in positions optimizing the viewing angles of the different cameras. Some cameras can be stereo cameras. In a preferred embodiment, one pair of front cameras are stereo cameras. In a more preferred embodiment, the robot comprises 4 (four) pairs of stereo cameras. In this preferred embodiment, the stereo cameras are positioned in the front of the robot, on both sides of the robot and on the back of the robot. One more camera is positioned in the front of the robot. The stereo cameras can be used to triangulate objects captured in the visual images. Depth perception of the visual images can be improved with stereo cameras. The separation between the stereo cameras can be 5-20 cm. In a preferred embodiment, the separation between the front and back stereo cameras is 5-10 cm and the separation between the sides stereo cameras is 15-20 cm. The cameras can be placed on the robot so as to take landscape orientation visual images and/or portrait orientation visual images. Landscape orientation visual images can be understood to mean visual images wherein the wider camera capture angle is approximately parallel to the ground and the narrower camera capture angle is approximately perpendicular to the ground. In a preferred embodiment, the side cameras are placed in a portrait orientation and the front and back cameras are placed in a landscape orientation. In one embodiment, the cameras can take visual images of an unstructured outdoor environment. This environment can comprise at least one or any combination of pedestrian paths comprising stationary and moving obstacles (for example pedestrians, animals, strollers, wheelchairs, mailboxes, trash cans, street lights and the like), vehicle roads including vehicles, bicycles, traffic lights and the like and/or other traversable environments such as parking lots, lawns and/or fields.

The use of a plurality of cameras to localize the robot can be particularly advantageous. A plurality of cameras can be pointed in a plurality of directions, therefore covering a larger part of the robot's surroundings. Furthermore, if one camera comprises a defect and/or gets blocked, the other cameras can allow the robot to still perform localization. This can be particularly relevant for a robot operating outdoors, as weather conditions such as sunlight, rain, snow, fog, hail or similar can obstruct the view of the cameras. Multiple cameras are also particularly advantageous for the current inventions, as some landmarks and/or physical objects can be seen on images taken by different cameras. This can be used by the algorithm to confirm that those lines do belong to a landmark and/or to a physical object. Conversely, if a line or several lines are seen only on one camera, the lines can be an artefact of the light and/or a transient object captured only by one camera. This is very advantageous when lines are being associated to landmarks and/or compared with an existing map.

The processing component can be part of and/or comprise a System on a Chip (SoC), for example similar to smartphone processors. The memory component can be part of the same SoC. The processing component can be adapted to localize the robot using the visual images captured by the cameras. The processing component can preferably also be adapted to extract features from the visual images captured by the cameras. In one preferred embodiment, the features can be straight lines. The straight lines can be extracted by applying an edge detection algorithm (such as Canny algorithm for example) followed by a line extractor algorithm (such as Hough transform for example) to the preprocessed visual images. Preprocessing can include combining the images, sharpening the images, smoothing the images and/or adding contrast to the images. It can also include any adjustment to image color scheme.

The extracted features can be used to build a map of the robot's operating area and/or to localize the robot using an existing map. A map can comprise a collection of vectors and/or lines and/or line segments and/or point features and/or grid features defined with respect to some coordinate system. The map can be preloaded onto a memory component of the robot. Alternatively, the map is downloaded onto the memory component during operation. The map can be downloaded in fragments as the robot is moving between geographical areas.

The cameras on the robot can take visual images of the robot's surroundings during its roving in an operating area. The cameras can be adapted to take images with a frequency of 1 to 10 images per second, such as 2 to 8 images per second, or 3 to 7 images per second, or 3 to 5 images per second, or 4 to 6 images per second. In one embodiment, the cameras are adapted to take images at a frequency of 4 images per second. Preferably, image capture is performed continuously during the robot's operation at the described frequency, i.e. the robot is preferably adapted to take images continuously using at least one, and preferably all, of the cameras during its operation. The visual images can then be combined into one file and preprocessed. Preferably, the images from different cameras are taken simultaneously. This can mean that the time difference of the different images to be processed is considerably shorter than the time between successive images that are processed. After preprocessing, the file containing preprocessed image data is separated into individual image files representing the different cameras, and the straight lines are extracted from the individual images. The straight lines are then combined and used to build map data of the robot's operating area.

In yet another embodiment, the robot already has stored map data on its memory component. The extracted straight lines are then compared with stored map data and run through a particle filter to model the probability distribution of the robot pose. An optimal pose is then chosen based on the comparison. Below follows a detailed description of the particle filter method within the context of the invention.

Particle filter is an iterative algorithm used in multiple applications to assign likelihoods to multiple probabilistic states of a system. Along with an estimate on the most likely state(s), the particle filter yields an error estimate for each possibility. The basic idea is to consider a certain fixed number of "particles" or potential states of the system. The number of particles used varies based on application and computational power available. The invention described herein can use anywhere between 10-1000 particles in the particle filter, more preferably 100-1000, even more preferably around 500. The position of the robot can be modelled as a Gaussian, and the error is then given by a covariance matrix that can be written as $$\sum\nolimits_{robot} = RDR^T = R\begin{pmatrix} \sigma_1^2 & 0 & 0 \\ 0 & \ddots & 0 \\ 0 & 0 & \sigma_M^2 \end{pmatrix}R^T$$

Where R is a rotation matrix and D a diagonal matrix of variances (standard deviations squared). The confidence region for probability p can then be derived. In a two-dimensional case (M=2), this region can comprise an ellipse with radii $\sigma_1\chi_2^{-1}(p)$ and $\sigma_2\chi_2^{-1}(p)$. Note, that $\chi_2^{-1}$ refers to the square root of the inverse cumulative distribution function, that is, the square root of the quantile function. For example, there is about 87% probability of a normally distributed value falling within an ellipse that is rotated by R and with radii $2\sigma_1$ and $2\sigma_2$ (as $\chi_2^{-1}(0.87) \approx 2$).

Each particle can carry a hypothesis of the robot's state, that is the robot's position and orientation $x_i(t)$, and also a weight (a number $w_i(t)$) indicating the strength of the hypothesis. The weight only makes sense in the context of other particles, so that not its absolute value, but rather its relative value to the other particles' weights is important. The position of the robot at some time t can then be calculated (in schematic form) as $$x(t) = \frac{1}{\sum_{i=1}^N w_{i(t)}} \sum_{i=1}^N w_i(t) \cdot x_i(t)$$

where N is the total number of particles, $w_i$ is the weight of particle i, and $x_i$ is the position of the particle i. The error of the robot's position (standard deviation) can then be estimated in a standard way as:

$$\sigma_x = \sqrt{\sum_{i=1}^N w_i x_i^2 - \left(\sum_{i=1}^N w_i x_i\right)^2}$$

where it is assumed that $\Sigma_{i=1}^N w_i = 1$. It is also assumed here that the particle cloud is unimodal, i.e. the particles are concentrated around one distinct location in the search space. In a preferred embodiment, the invention is further adapted to detect multimodal distributions, that is cases where particles are concentrated around two or more distinct locations. Note that the above is a schematic example of the method and that the error can be calculated using more involved methods. This is due to the fact that errors in robot orientation (involving 3D rotation) are more involved that errors in robot x-y position and need to be treated more carefully. In fact, errors in rotational degrees of freedom cannot be properly estimated using this approach. For example, two particles with rotation (azimuthal direction) −179° and +179° would have an arithmetic average of 0°. This clearly does not represent reality, since the true average must be either −180° or +180°. Conventionally, rotational degrees of freedom are often represented with Euler angles. Calculating the covariance matrix for those variables can be involved, and other methods can be used.

The inputs used in the particle filter can come from two types of sensor input: control inputs and sensing inputs. Control inputs can comprise odometer readings, and/or gyroscope readings. Sensor inputs can comprise GPS readings, magnetometer readings, accelerometer readings and/or visual camera readings. All readings can first be processed within the processing component of the robot or used as received if appropriate. Control inputs can be used to directly advance the position of the particles. This can result in increase in the robot pose error estimate, as particles drift apart due to errors. Sensor inputs can be used to modify the weights of the particles, reducing the weight of particles whose position does not conform to sensor readings. This can contribute to reducing the pose error estimate.

Control inputs can comprise an estimate of their random errors. They can be used to generate a separate set of incremental motion and rotation values for each particle. Schematically, we have then $$c_i(t) = RND(c(t), \Sigma_c(t))$$

$$x_i(t) = f(x_i(t-1), c_i(t))$$

where, in the first line, $c_i$ is the control input for particle i including error, $RND(\sigma_c)$ is a random error generator (usually of a normal distribution), and c(t) is the control input with the given covariance matrix $\Sigma_c(t)$ (the control input error estimate). The second line indicates that the i'th particle position $x_i(t)$ can be calculated via function $f$ using the particle's position at time $t-1$, $x_i(t-1)$ and the sampled control input. The purpose of adding random values is to model the error distribution of the robot pose. All likely robot poses after a step can thus be covered. The sampling can be taken from the probability distribution of the robot location after movement. After taking many steps, every particle would eventually drift away in separate directions and the estimate of the location error would grow without bounds.

To counter this, sensing inputs can be used. In the following, the GPS sensor is used as an example embodiment of a sensing input. GPS software provides the location of the GPS antenna and a covariance matrix of the error estimate of this location. Thus, the GPS position can be modelled as a Gaussian. From this, the exact probability that the robot is in some area $A_i$ can be calculated as:

$$p_i^{GPS}(t) = \frac{1}{\sqrt{(2\pi)^{dim(\Sigma_{GPS})}|\Sigma_{GPS}|}} \int_{A_i(t)} e^{-\frac{1}{2}(x-g(t))^T \Sigma_{GPS}^{-1}(x-g(t))} dx$$

where g(t) is the GPS position at time t, and $\Sigma_{GPS}$ is the covariance matrix of the error estimate of the given GPS location. This can be simplified to $$p_i^{GPS} \approx k e^{c_{GPS}(x_i-g)^T \Sigma_{GPS}^{-1}(x_i-g)\Delta t}$$

where k is a constant, $c_{GPS}$ is the weighting coefficient for the GPS sensor. The time delta, $\Delta t$, is the time between measurements and is used to incorporate a "rate of decay" of particles. It is particularly important if measurements are done at variable intervals. The weight of each particle i at the time step t with respect to the GPS sensor can then be obtained as:

$$w_i(t) = p_i^{GPS}(t) w_i(t-1)$$

The quantity $p_i^{GPS}$ is not exactly the probability of a particle. Rather, it makes sense to view it as a fitness of the particle in reference to the GPS sensor measurement. Particles that are closer to the GPS position get a larger $p_i^{GPS}$ and so their weight will not be reduced as much as particles with low fitness. All of this can be viewed in relative terms, that is one particle in comparison to another.

Note that the GPS sensor can be placed centrally or otherwise on the robot's frame, and this offset can be added to the robot position when making the comparison. Also note that GPS readings can contain large systematic errors, so this treatment here is simplified. Aside from the GPS, the robot can comprise further sensors such as the magnetometer, the accelerometer, and/or the cameras. For each of those sensors, a fitness value can be calculated, and the resulting particle weight can be given by:

$$w_i(t) = w_i(t-1) \cdot \prod_j p_i^{Sensor_j}$$

where $p_i^{Sensor_j}$ refers to the particle weight with respect to a given sensor and may be given by $$p_i^{Sensor_j} = e^{c_{Sensor_j}(x_i - \mu_{Sensor_j})^T \Sigma_{Sensor_j}^{-1}(x_i - \mu_{Sensor_j})\Delta t}$$

The weighting coefficient $c_{Sensor_j}$ of each sensor determines how strong each sensor is compared to the others. That is, how strongly and how quickly the given sensor affects other particles. The coefficients can be adjusted based on testing and sensor quality. Further, instead of using the weighting coefficient, the covariance matrix $\Sigma_{Sensor_j}$ can be directly modified to better model the errors within. For example, for the GPS sensor, constant values can be added to all the diagonal elements of the covariance matrix.

In this way, particles that don't match sensor readings can get their weights more reduced than particles that conform to sensor readings. Having considered the input of the sensors, the particle weights can be normalized as follows:

$$w_i(t) \rightarrow \frac{1}{\sum_i w_i(t)} w_i(t)$$

Eventually, after multiple time steps, many particles will have a negligible weight compared to few ones with a large weight. This effect gets progressively worse in the absence of any resampling step. If this process continued, the particle filter would output only a few particles with relatively high weight, and the rest with marginal weight—this is one way the particle filter can fail, since only one particle does not represent the robot pose probability distribution that well. To prevent this, a way to discard the particles in areas of marginal probability of the robot pose and create new ones in the areas of large probability of the robot pose is needed, all the while keeping the distribution of the error estimate as it was before. This is known as a resampling step. One method that can be used is the Sequential Importance Resampling (SIR). Running SIR every step is wasteful in terms of computing resources and can actually lead to some "good" particles dropped. So SIR is run only when a particular condition is reached for the number of "effective" particles. This condition could for example be related to the effective number of particles falling below half of the particle count (effective referring here to non-marginal particles).

The processing component is adapted to localize the robot with an error of at most 10 cm. In a preferred embodiment, the processing component is adapted to localize the robot with an error of at most 5 cm. In a more preferred embodiment, the processing component is adapted to localize the robot with an error of at most 3 cm. The precision of the localization can depend on the number of the cameras and/or on the knowledge of the relative positions of the cameras and/or on the calibration of the system. Localization can be more precise for objects located closer than for objects located further away.

The processing component can combine the features extracted from visual images taken by different cameras into a coherent map and/or localize using the combined extracted features. The processing component is adapted to provide instructions about navigation of the robot, by using visual localization based on the extracted features, as well as map information and information about the intended destination of the robot. Navigation can include changing the pose of the robot (6 degree-of-freedom position and orientation data) by moving in some direction and/or rotating. Navigation can further include making decisions about the best course of movement and adapting those decisions based on the localization information.

The robot can further comprise a plurality of sensors adapted to measure different parameters related to the environment and/or to the localization of the robot. The sensors can comprise at least one or any combination of at least one GPS component, at least one accelerometer, at least one gyroscope (in a preferred embodiment 4 (four) gyroscopes), at least one odometer, at least one magnetometer, at least one time of flight camera and/or at least one Lidar sensor. A preferred embodiment comprises at least one of all of those sensors. In a preferred embodiment, the sensors measure data related to the pose of the robot. The processing component localizes the robot by first processing the sensor data for an approximate pose estimate, and then improving this estimate by using visual localization. The pose improvement can for example be done by using a particle filter. The features extracted from the visual images can be compared to a map comprising features corresponding to a certain set of different poses. The particle filter can then select the most likely pose estimate from the set based on the likelihood of each pose. The processing component can be adapted to localize the robot based on an iterative algorithm estimating robot pose at set time intervals. This iterative algorithm can rely on an application of the particle filter method. A hypothesis on a robot's pose can include data from at least one sensor such as at least one camera, a GPS component, an odometer, an accelerometer, a time of flight camera and/or a magnetometer. A sensor's data can further be absolute (such as data from a GPS component and/or data obtained from visual camera images for example) or relative to previous robot pose (such as data from odometers and/or gyroscopes for example).

The robot can further comprise a pressure sensor. The pressure sensor can be used for precise altitude-based localization. In one embodiment, another pressure sensor can be located at a known location within the robot's area of operation, for example at a hub. The hub can be a physical location (for example a parking lot), a physical structure (for example a house, a warehouse, a shipping container, a barn, a depot and/or a garage), and/or a mobile structure (for example a truck, a trailer and/or a train wagon). The hub can serve as a storage, maintenance, repair, recharging and resupply station for the robot. One hub can comprise one or more robots. In a preferred embodiment, one hub can service a plurality of robots, such as 20-200 robots. With a pressure sensor placed at the location of the hub, a precise altitude reference is established, and the localization of the robot can be improved by comparing the data from the robot's pressure sensor to the data from the hub's pressure sensor.

The processing component of the robot can be further adapted to localize the robot by executing an iterative algorithm estimating robot pose, preferably said algorithm at least partially based on a particle filter algorithm, as described above. However, localization can also be done using a different algorithm, for example an iterative optimization algorithm wherein the unknown variables comprise the robot's pose.

In some embodiments, the iterative algorithm can be adapted to generate a hypothesis on a robot's pose by processing data from at least one sensor such as at least one camera, at least one GPS component, at least one odometer, at least one gyroscope, at least one accelerometer, at least one Lidar sensor, at least one time of flight camera, at least one ultrasonic sensor, at least one pressure sensor, at least one dead-reckoning sensor, and/or at least one magnetometer.

In some embodiments, input data and/or image data from at least one camera and map related input data from at least one further sensor can be used to generate an estimate of a robot's pose. In such embodiments, each contribution to the estimation or optimization can be weighted based on the error associated with the camera's and/or the given sensor's data. That is, the iterative algorithm can consider several inputs as part of its optimization of the robot's pose. It can further consider those inputs with their respective errors. For example, the GPS sensor estimate generally comprises an elliptical error estimate on a plane.

The robot can further comprise a communication component adapted to exchange data with one or more server, particularly image and/or map data. The server can comprise multiple servers and/or a cluster of servers and/or one or more cloud servers. In one preferred embodiment, the server is a cloud server. In another embodiment, the server comprises a cluster of servers, some of which can be cloud servers. The server can store, analyse and/or send out data, such as for example map and localization related data. The server can also perform calculations, for example calculations related to the generation of a geographical map, localization calculations, and/or route calculations for the robot. The communication component can comprise at least one slot for a Subscriber Identity Module (SIM card) and/or a modem and/or a network device, preferably two slots for two SIM cards, and/or two modems, and/or two network devices. The network device can comprise an eSIM and/or a similar chip/system. The use of two SIM cards and/or modems is an advantage, since it increases reliability and allows for simultaneous communication via both SIM cards and/or modems for larger and/or faster data transmission. In a preferred embodiment, two different mobile operators are used for operation using the two SIM cards and/or modems. In this case, if one mobile operator does not provide coverage in some part of the robot's area of operation, the robot can still communicate via the other SIM card and/or the modem.

The robot can further be adapted to receive navigation instructions from the server at specific intervals and/or after requesting input from the server. In one embodiment, the robot receives navigation instructions every 50-150 meters. The robot can further send a request for input to the server when faced with an unfamiliar situation. The robot can also request manual input about its navigation, for example when facing hazardous conditions such as crossing a street. During such manual operation, a remote operator can provide navigation instructions to the robot and direct it through the hazard, such as across the street. Once the robot has reached a safe environment, the operator can instruct the robot to resume autonomous navigation. The operator can further communicate with people in the immediate surroundings of the robot through the microphone and speakers that can be mounted on the robot. The robot can however continue to update its localization during manual control.

In another embodiment, the invention discloses an assembly of mobile robots comprising at least two mobile robots. The robots can be as described above. The robots can be adapted to communicate with each other via the communication module. The communication can be routed via the server. The data sent between the robots and/or between the robots and the server can be combined into a map of an operating area and/or of multiple operating areas. The coordinates used for each map data can be different, but they can each be converted into a standard coordinate system and/or combined in one unified arbitrary coordinate system. Multiple operating areas can correspond for example to different parts of a city. An operating area can comprise one hub and/or multiple hubs. The robots benefit from the map data gathered by the other robots via the map data exchange. The server can coordinate the exchange of map data. The server can further store map data and unify it into a global map. The server can send out map data to the robots based on their operating area. The map data can further be updated by the robots if the visual images taken by the cameras demonstrate a consistent change in the extracted features. For example, if new construction work is taking place within an operating area, the map of this operating area can be updated correspondingly.

In some preferred embodiments, the method can be used as a SLAM method by an autonomous and/or semi-autonomous mobile robot. SLAM refers to simultaneous localization and mapping. That is, in some embodiments, the method can be run on the robot as it navigates autonomously and/or semi-autonomously. As the algorithm can also yield the path that the robot took, the robot can localize itself and build map data of its surroundings simultaneously. This can be particularly advantageous, as the robot can then just navigate through an unfamiliar area and build map data of it without previously knowing what the area looks like.

In some embodiments, the presently described method and/or device and/or assembly can be directed to a vehicle, a car and/or a self-driving car. That is, the mapping method can be used by a self-driving car to build map data, and/or to navigate and/or to perform SLAM.

However, in other embodiments, the device and/or the assembly described herein, that is, the mobile robot and/or the assembly of mobile robots are substantially different from a car and/or a self-driving car. That is, in such embodiments, the mobile robot is significantly smaller than a car. In such embodiments, typical dimensions of the robot may be as follows. Width: 20 to 100 cm, preferably 40 to 70 cm, such as about 55 cm. Height: 20 to 100 cm, preferably 40 to 70 cm, such as about 60 cm. Length: 30 to 120 cm, preferably 50 to 80 cm, such as about 65 cm. In such embodiments, the mobile robot is also sufficiently lighter than a car and/or a self-driving car. In such embodiments, the weight of the robot may be in the range of 2 to 50 kg, preferably in 5 to 40 kg, more preferably 7 to 25 kg, such as 10 to 20 kg. In such embodiments, the robot can also be adapted to operate on the sidewalks unlike a car and/or a self-driving car. It can further have a velocity of no more than 20 km/h, such as no more than 10 km/h, preferably between 4 and 6 km/h.

That is, embodiments where the present invention can be applied to cars and/or self-driving cars are substantially different from embodiments where it can be applied to smaller, and/or lighter, and/or slower mobile robots.

It is known in the art that self-driving cars can use a plurality of sensors to autonomously navigate on public roads. Often, self-driving cars use Lidar sensors as a primary or one of the primary means of localization. The current invention can present a cost, space and equipment efficient way to localize a mobile robot with a precision of a few centimetres. The current invention can be applied to self-driving cars, however, the technology presently used for self-driving cars can be cumbersome and impractical to use on a mobile delivery robot operating on sidewalks.

Below, further numbered embodiments of the invention will be discussed.

1. A mobile robot comprising
  (a) at least one memory component comprising at least map data;
  (b) at least two cameras adapted to take visual images of an environment; and
  (c) at least one processing component adapted to at least extract features from the visual images taken by the at least two cameras and compare them to the map data to at least localize the robot.

2. A robot according to the preceding embodiment wherein the memory component comprises at least one Random Access Memory (RAM) device.

3. A robot according to any of the preceding embodiments wherein the map data comprised within the memory component relates to a robot's current and/or prospective operating area.

4. A robot according to any of the preceding embodiments wherein map data comprises a plurality of vectors, point features and/or grid features defined with respect to a coordinate system.

5. A robot according to any of the preceding embodiments wherein the map data can be converted to GPS coordinates.

6. A robot according to any of the preceding embodiments wherein each camera is adapted to capture 3-5 images per second, preferably 4 images per second.

7. A robot according to any of the preceding embodiments wherein the camera capture angle is 10°-120°.

8. A robot according to any of the preceding embodiments comprising at least 4 cameras, preferably 9 cameras.

9. A robot according to the preceding embodiment wherein at least one pair of cameras is a stereo camera.

10. A robot according to the preceding embodiment wherein the distance between the stereo cameras is 5-20 cm.

11. A robot according to any of the preceding embodiments wherein at least one camera is adapted for taking landscape orientation visual images and at least one camera is adapted for taking portrait orientation visual images.

12. A robot according to any of the preceding embodiments wherein the cameras and/or processing component are adapted to take and process visual images in an environment that comprises at least one or any combination of: pedestrian paths, stationary and/or moving obstacles and other traversable environments such as parking lots, lawns and/or fields.

13. A robot according to any of the preceding embodiments wherein the processing component comprises at least one System on a Chip (SoC).

14. A robot according to any of the preceding embodiments wherein the processing component is adapted to localize the robot with an error of at most 10 cm, preferably at most 5 cm, more preferably at most 3 cm.

15. A robot according to any of the preceding embodiments wherein the processing component is adapted to extract straight lines from the visual images.

16. A robot according to any of the preceding embodiments wherein the processing component is adapted to build map data of the robot's area of operation.

17. A robot according to any of the preceding embodiments adapted to navigate using the localization data from the processing component.

18. A robot according to any of preceding embodiments wherein the processing component combines visual images from the plurality of cameras to build map data and/or localize the robot.

19. A robot according to any of the preceding embodiments further comprising sensors adapted to measure further parameters for localization of the robot.

20. A robot according to the preceding embodiment wherein the sensors comprise at least one or any combination of at least one GPS component, at least one accelerometer, at least one gyroscope, a least one odometer, at least one magnetometer and/or at least one Lidar sensor.

21. A robot according to the preceding two embodiments where the processing component is adapted to determine localization of the robot by first processing data from the sensors to obtain an approximate location and then refining the localization based on processing of the features extracted from the visual images.

22. A robot according to any of the preceding embodiments further comprising a pressure sensor for precise altitude-based localization.

23. A robot according to any of the preceding embodiments further comprising a communication component adapted to exchange data with one or more server, particularly image and/or map data.

24. A robot according to the preceding embodiment wherein the communication component comprises at least one slot for at least one Subscriber Identity Module (SIM card), preferably 2 slots for 2 SIM cards for increased reliability and/or simultaneous communication using both SIM cards simultaneously.

25. A robot according to the preceding two embodiments wherein the robot is further adapted to receive navigation instructions from the server at specific intervals and/or after requesting input.

26. A robot according to any of the preceding embodiments wherein the robot is autonomous and/or semi-autonomous.

27. A robot according to any of the preceding embodiments wherein the robot is land-based.

28. A robot according to any of the preceding embodiments wherein the robot is adapted to travel with a speed of no more than 10 km/h, or no more than 8 km/h, or no more than 6 km/h, preferably between 3 and 6 km/h or, more preferably, between 4 and 5 km/h.

29. A robot according to any of the preceding embodiments wherein the robot is used for delivery purposes.

30. A robot according to any of the preceding embodiments wherein the robot and its delivery weigh no more than 40 kg, such as no more than 35 kg, such as no more than 30 kg, such as no more than 25 kg, preferably between 15 and 25 kg, more preferably between 20 and 25 kg.

31. A robot according to any of the preceding embodiments wherein the robot further comprises a wheel mechanism comprising at least 4 wheels that are adapted to land-based motion.

32. A robot according to any one of the preceding embodiments, further comprising a space for holding at least one delivery.

33. A robot according to any one of the preceding embodiments, further comprising an enclosed space for holding at least one delivery.

34. A robot according to the preceding embodiment, further comprising a secure access device for providing access to the space.

35. A robot according to the preceding embodiment, wherein the secure access device comprises a closure mechanism that is controlled by a secure interface.

36. A robot according to any of the preceding embodiments wherein the processing component is adapted to localize the robot by executing an iterative algorithm estimating robot pose at set time intervals.

37. A robot according to the preceding embodiment wherein the iterative algorithm applies a particle filter method to estimate the robot pose.

38. A robot according to the preceding two embodiments wherein the particle filter is adapted to generate a hypothesis on a robot's pose by processing data from at least one sensor such as at least one camera, a GPS component, an odometer, at least one gyroscope, an accelerometer, and/or a magnetometer.

39. A robot according to the preceding embodiment wherein input data from at least two sensors' data is used to generate as estimate of a robot's pose and each contribution is weighted based on the error associated with a given sensor's data.

40. A mobile robot comprising
(a) at least one memory component comprising at least map data;
(b) at least two cameras adapted to take visual images of an environment; and
(c) at least one processing component adapted to at least extract straight lines from the visual images taken by the at least two cameras and compare them to the map data to at least localize the robot.

41. A robot according to the preceding embodiment wherein the memory component comprises at least one Random Access Memory (RAM) device.

42. A robot according to any of the preceding embodiments 40 to 41 wherein the map data comprised within the memory component relates to a robot's current and/or prospective operating area.

43. A robot according to any of the preceding embodiments 40 to 42 wherein map data comprises a plurality of vectors, point features and/or grid features defined with respect to a coordinate system.

44. A robot according to any of the preceding embodiments 40 to 43 wherein the map data can be converted to GPS coordinates.

45. A robot according to any of the preceding embodiments 40 to 44 wherein each camera is adapted to capture 3-5 images per second, preferably 4 images per second.

46. A robot according to any of the preceding embodiments 40 to 45 wherein the camera capture angle is 10°-120°.

47. A robot according to any of the preceding embodiments 40 to 46 comprising at least 4 cameras, preferably 9 cameras.

48. A robot according to the preceding embodiment wherein at least one pair of cameras is a stereo camera.

49. A robot according to the preceding embodiment wherein the distance between the stereo cameras is 5-20 cm.

50. A robot according to any of the preceding embodiments 40 to 49 wherein at least one camera is adapted for taking landscape orientation visual images and at least one camera is adapted for taking portrait orientation visual images.

51. A robot according to any of the preceding embodiments 40 to 50 wherein the cameras and/or processing component are adapted to take and process visual images in an environment that comprises at least one or any combination of pedestrian paths comprising stationary and moving obstacles and other traversable environments such as parking lots, lawns and/or fields.

52. A robot according to any of the preceding embodiments 40 to 51 wherein the processing component comprises at least one System on a Chip (SoC).

53. A robot according to any of the preceding embodiments 40 to 52 wherein the processing component is adapted to localize the robot with an error of at most 10 cm, preferably at most 5 cm, more preferably at most 3 cm.

54. A robot according to any of the preceding embodiments 40 to 53 wherein the processing component is adapted to build map data of the robot's area of operation.

55. A robot according to any of the preceding embodiments 40 to 54 adapted to navigate using the localization data from the processing component.

56. A robot according to any of preceding embodiments 40 to 55 wherein the processing component combines visual images from the plurality of cameras to build map data and/or localize the robot.

57. A robot according to any of the preceding embodiments 40 to 56 further comprising sensors adapted to measure further parameters for localization of the robot.

58. A robot according to the preceding embodiment wherein the sensors comprise at least one or any combination of at least one GPS component, at least one accelerometer, at least one gyroscope, a least one odometer, at least one magnetometer and/or at least one Lidar sensor.

59. A robot according to the preceding two embodiments where the processing component is adapted to determine localization of the robot by first processing data from the sensors to obtain an approximate location and then refining the localization based on processing of the features extracted from the visual images.

60. A robot according to any of the preceding embodiments 40 to 59 further comprising a pressure sensor for precise altitude-based localization.

61. A robot according to any of the preceding embodiments 40 to 60 further comprising a communication component adapted to exchange data with one or more server, particularly image and/or map data.

62. A robot according to the preceding embodiment wherein the communication component comprises at least one slot for at least one Subscriber Identity Module (SIM card), preferably 2 slots for 2 SIM cards for increased reliability and/or simultaneous communication using both SIM cards simultaneously.

63. A robot according to the preceding two embodiments wherein the robot is further adapted to receive navigation instructions from the server at specific intervals and/or after requesting input.

64. A robot according to any of the preceding embodiments 40 to 63 wherein the robot is autonomous and/or semi-autonomous.

65. A robot according to any of the preceding embodiments 40 to 64 wherein the robot is land-based.

66. A robot according to any of the preceding embodiments 40 to 65 wherein the robot is adapted to travel with a speed of no more than 10 km/h, or no more than 8 km/h, or no more than 6 km/h, preferably between 3 and 6 km/h or, more preferably, between 4 and 5 km/h.

67. A robot according to any of the preceding embodiments 40 to 66 wherein the robot is used for delivery purposes.

68. A robot according to any of the preceding embodiments 40 to 67 wherein the robot and its delivery weigh no more than 40 kg, such as no more than 35 kg, such as no more than 30 kg, such as no more than 25 kg, preferably between 15 and 25 kg, more preferably between 20 and 25 kg.

69. A robot according to any of the preceding embodiments 40 to 68 wherein the robot further comprises a wheel mechanism comprising at least 4 wheels that are adapted to land-based motion.

70. A robot according to any one of the preceding embodiments 40 to 69, further comprising a space for holding at least one delivery.

71. A robot according to any one of the preceding embodiments 40 to 70, further comprising an enclosed space for holding at least one delivery.

72. A robot according to the preceding embodiment, further comprising a secure access device for providing access to the space.

73. A robot according to the preceding embodiment, wherein the secure access device comprises a closure mechanism that is controlled by a secure interface.

74. A robot according to any of the preceding embodiments 40 to 73 wherein the processing component is adapted to localize the robot by executing an iterative algorithm estimating robot pose at set time intervals.

75. A robot according to the preceding embodiment wherein the iterative algorithm applies a particle filter method to estimate the robot pose.

76. A robot according to the preceding two embodiments wherein the particle filter is adapted to generate a hypothesis on a robot's pose by processing data from at least one sensor such as at least one camera, a GPS component, an odometer, at least one gyroscope, an accelerometer, and/or a magnetometer.

77. A robot according to the preceding embodiment wherein input data from at least two sensors' data is used to generate as estimate of a robot's pose and each contribution is weighted based on the error associated with a given sensor's data.

78. An assembly of mobile robots comprising at least two mobile robots, and each of the robots comprising (a) at least one memory component comprising at least map data;

(b) at least two cameras adapted to take visual images of an environment;

(c) at least one processing component adapted to at least extract features from the visual images taken by the at least one camera and compare them to the map data to at least localize the robots; and (d) at least one communication component adapted to send and receive data between the robots, particularly image and/or map data.

79. An assembly according to the preceding embodiment wherein the memory component comprises at least one Random Access Memory (RAM) device.

80. An assembly according to any of the preceding two embodiments wherein the map data comprised within the memory component relates to the robot's current and/or prospective operating area.

81. An assembly according to any of the preceding embodiments 78 to 80, wherein the map data comprises a plurality of vectors, point features and/or grid features defined with respect to a coordinate system.

82. An assembly according to any of the preceding embodiments 78 to 81 wherein the map data can be converted to GPS coordinates.

83. An assembly according to any of the preceding embodiments 78 to 82, wherein each camera captures 3-5 images per second, preferably 4 images per second.

84. An assembly according to any of the preceding embodiments 78 to 83, wherein the camera capture angle is 10°-120°.

85. An assembly according to any of the preceding embodiments 78 to 84, wherein the robot comprises at least 4 cameras, preferably 9 cameras.

86. An assembly according to the preceding embodiment wherein at least one pair of cameras is a stereo camera.

87. An assembly according to the preceding embodiment wherein the distance between the stereo cameras is 5-20 cm.

88. An assembly according to any of the preceding embodiments 78 to 87, wherein at least one camera is adapted for taking landscape orientation visual images and at least one camera is adapted for taking portrait orientation visual images.

89. An assembly according to any of the preceding embodiments 78 to 88, wherein the cameras and/or processing component are adapted to take and process visual images in an environment that comprises at least one or any combination of: pedestrian paths, stationary and/or moving obstacles and other traversable environments such as parking lots, lawns and/or fields.

90. An assembly according to any of the preceding embodiments 78 to 89 wherein the processing component comprises at least one System on a Chip (SoC).

91. An assembly according to any of the preceding embodiments 78 to 90, wherein the processing component is adapted to localize the robot with an error of at most 10 cm, preferably at most 5 cm, more preferably at most 3 cm.

92. An assembly according to any of the preceding embodiments 78 to 91, wherein the processing component is adapted to extract straight lines from the visual images.

93. An assembly according to any of the preceding embodiments 78 to 92, wherein the processing component is adapted to build map data of the robot's area of operation.

94. An assembly according to any of the preceding embodiments 78 to 93, wherein the robot is adapted to navigate using the localization data from the processing component.

95. An assembly according to any of preceding embodiments 78 to 94, wherein the processing component combines visual images from the plurality of cameras to build map data and/or localize the robot.

96. An assembly according to any of the preceding embodiments 78 to 95, wherein the robot further comprises sensors adapted to measure further parameters for localization of the robot.

97. An assembly according to the preceding embodiment wherein the sensors comprise at least one or any combination of at least one GPS component, at least one accelerometer, at least one gyroscope, a least one odometer, at least one magnetometer and/or at least one Lidar sensor.

98. An assembly according to the preceding two embodiments where the processing component is adapted to determine localization of the robot by first processing data from the sensors to obtain an approximate location and then refining the localization based on processing of the features extracted from the visual images.

99. An assembly according to any of the preceding embodiments 78 to 98, wherein the robot further comprises a pressure sensor for precise altitude-based localization.

100. An assembly according to any of the preceding embodiments 78 to 99, wherein the data sent between the robots can be combined into a map of multiple operating areas.

101. An assembly according to any of the preceding embodiments 78 to 100, wherein the robots are adapted to exchange map data.

102. An assembly according to any of the preceding embodiments 78 to 101, further comprising at least one server adapted to at least communicate with the robots via their communication component.

103. An assembly according to the preceding embodiment wherein the robots are adapted to communicate with each other via the server.

104. An assembly according to any of the preceding two embodiments wherein the communication component is adapted to exchange data with the server, particularly image and/or map data.

105. An assembly according to the preceding three embodiments wherein the server can store map data.

106. An assembly according to the preceding four embodiments wherein the server is adapted to receive map data from the robots, process it and send processed data back to the robots when requested, allowing robots to benefit from the map data collected by other robots.

107. An assembly according to the preceding five embodiments wherein each robot receives navigation instructions from the server at specific intervals and/or after requesting input.

108. An assembly according to the preceding embodiment wherein the communication component comprises at least one slot for at least one Subscriber Identity Module (SIM card), preferably 2 slots for 2 SIM cards for increased reliability and/or simultaneous communication using both SIM cards simultaneously.

109. An assembly according to the preceding two embodiments wherein the robot is further adapted to receive navigation instructions from the server at specific intervals and/or after requesting input.

110. An assembly according to any of the preceding embodiments 78 to 109, wherein the robot is autonomous and/or semi-autonomous.

111. An assembly according to any of the preceding embodiments 78 to 110, wherein the robot is land-based.

112. An assembly according to any of the preceding embodiments 78 to 111, wherein the robot is adapted to travel with a speed of no more than 10 km/h, or no more than 8 km/h, or no more than 6 km/h, preferably between 3 and 6 km/h or, more preferably, between 4 and 5 km/h.

113. An assembly according to any of the preceding embodiments 78 to 112, wherein the robot is used for delivery purposes.

114. An assembly according to any of the preceding embodiments 78 to 113, wherein the robot and its delivery weight no more than 40 kg, such as no more than 35 kg, such as no more than 30 kg, such as no more than 25 kg, preferably between 15 and 25 kg, more preferably between 20 and 25 kg.

115. An assembly according to any of the preceding embodiments 78 to 114, wherein the robot further comprises a wheel mechanism comprising at least 4 wheels that are adapted to land-based motion.

116. An assembly according to any one of the preceding embodiments 78 to 115, further comprising a space for holding at least one delivery.

117. An assembly according to any one of the preceding embodiments 78 to 116, further comprising an enclosed space for holding at least one delivery.

118. An assembly according to the preceding embodiment, further comprising a secure access device for providing access to the space.

119. An assembly according to the preceding embodiment, wherein the secure access device comprises a closure mechanism that is controlled by a secure interface.

120. An assembly according to any of the preceding embodiments 78 to 119 wherein each robot's processing component is adapted to localize the robot by executing an iterative algorithm estimating robot pose at set time intervals.

121. An assembly according to the preceding embodiment wherein the iterative algorithm applies a particle filter method to estimate the robot pose.

122. An assembly according to the preceding two embodiments wherein the particle filter is adapted to generate a hypothesis on a robot's pose by processing data from at least one sensor such as at least one camera, a GPS component, an odometer, at least one gyroscope, an accelerometer, and/or a magnetometer.

123. An assembly according to the preceding embodiment wherein input data from at least two sensors' data is used to generate as estimate of a robot's pose and each contribution is weighted based on the error associated with a given sensor's data.

124. A mapping method comprising
(a) operating at least one mobile robot comprising at least two cameras and at least one processing component;
(b) taking visual images with the at least one robot's at least two cameras;
(c) performing preprocessing on a file generated by combining visual images from the at least two cameras;
(d) extracting features from the individual visual images with at least one processing component; and
(e) building map data using the extracted features from the visual images.

125. A method according to the preceding embodiment wherein the robot and/or the cameras and/or the processing component are as described in any of the preceding embodiments.

126. A method according to the preceding two embodiments wherein the features used for mapping are straight lines.

127. A method according to the preceding three embodiments wherein extracting the features is done on individual images generated by separating the combined visual images into the individual images.

128. A method according to the preceding four embodiments wherein the map data comprises a plurality of vectors, point features and/or grid features defined with respect to a coordinate system.

129. A method according to the preceding five embodiments wherein the map data can further be used to localize the robot.

130. A method according to the preceding six embodiments wherein the mobile robot is a robot or assembly as described in any one of the embodiments 1 to 111.

131. A localization method comprising
(a) operating at least one mobile robot comprising at least two cameras, at least one memory component, and at least one processing component;
(b) taking visual images with the at least one robot's at least two camera components;
(c) performing preprocessing on a file generated by combining visual images from the at least two cameras;
(d) extracting features from the individual visual images with at least one processing component;
(e) comparing the extracted features with existing map data stored on the at least one robot's at least one memory component; and
(f) localizing the at least one robot using the comparison in (e).

132. A method according to the preceding embodiment wherein the robot and/or the cameras and/or the memory component and/or the processing component are as described in any of the preceding embodiments.

133. A method according to any of the preceding two embodiments wherein the features used for localization are straight lines.

134. A method according to any of the preceding three embodiments wherein extracting the features is done on individual images generated by separating the combined visual images into individual images.

135. A method according to the preceding four embodiments wherein the map data comprises a plurality of vectors, point features and/or grid features defined with respect to a coordinate system.

136. A method according to any of the preceding five embodiments wherein the comparison in (e) is done using a particle filter.

137. A method according to any of the preceding six embodiments wherein the mobile robot is a robot or combination as described in any one of the embodiments 1 to 111.

138. A localization method comprising
(a) providing at least one mobile robot comprising at least one dead reckoning component, at least two cameras, at least one memory component, and at least one processing component; and
(b) taking visual images with the at least one robot's at least two camera components; and
(c) extracting features from the visual images with at least one processing component; and
(d) obtaining location related data from the extracted features in (c); and
(e) receiving location related data from the at least one dead reckoning component; and
(f) combining location related data obtained from the features extracted from the visual images in (d) and location related data received from the at least one dead reckoning component in (e); and
(g) forming a hypothesis on the robot's pose based on the combined data in (f).

139. A method according to embodiment 138 wherein the robot, and/or the cameras, and/or the memory component, and/or the processing component are as described in any of the preceding embodiments.

140. A method according to any of the preceding embodiments 138 or 139 wherein the dead reckoning component can comprise at least one of at least one odometer and/or at least one gyroscope and/or at least one accelerometer.

141. A method according to any of the preceding embodiments 138 to 140 wherein the location related data from the visual images features and the dead reckoning component combined in (f) is weighted based on errors associated with its measurement.

142. A method according to any of the embodiments 138 to 141 wherein step (f) can further comprise combining weighted location related data obtained from other sensors such as a GPS component, and/or a magnetometer.

143. A method according to any of the embodiments 138 to 142 wherein steps (f) and (g) can be implemented using a particle filter method.

144. A method according to any of the embodiments 138 to 143 wherein step (e) further comprises comparing the features extracted from the visual images with existing map data stored on the at least one robot's at least one memory component.

The above features along with additional details of the invention, are described further in the examples below, which are intended to further illustrate the invention but are not intended to limit its scope in any way.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps, can be present between some or all of the described steps.

Figure 1:
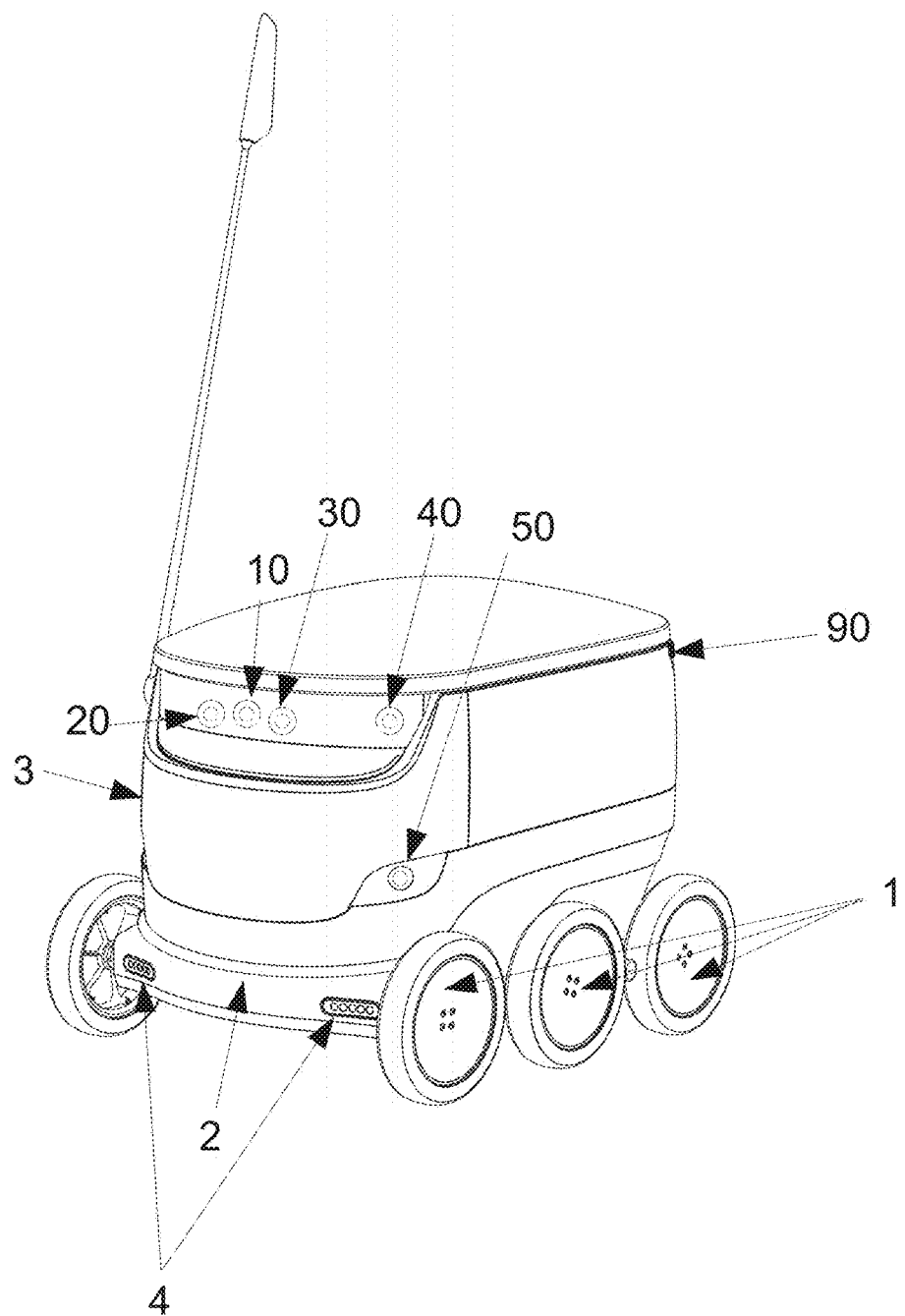
FIG. 1 shows a perspective view onto a robot embodiment in accordance with the present invention.

FIG. 1 shows an embodiment of the robot according to the invention. The robot comprises wheels 1 adapted for land-based motion. Frame 2 can be mounted on the wheels 1. Body 3 can be mounted on the frame 2. Body 3 can comprise an enclosed space (not shown) adapted to transport a delivery. Lights 4 can be placed around body 3 and/or frame 2. Lights 4 can for example be LED lights and can illuminate the environment in which the robot finds itself. This can be useful to indicate the presence of the robot in the dark and/or assist visual localization through better illumination. A plurality of cameras can be placed around body 3. In this embodiment, 9 (nine) cameras are present.

A first camera 10 can be positioned near the front of the robot on the body 3. The first camera can provide an approximately horizontal view away from the robot. A second camera 20 and a third camera 30 are positioned on the two sides of the first camera 10 similarly near the front of the robot.

Second camera 20 and third camera 30 can be angled 10-50° downwards, preferably 20-40° downwards with respect to the first camera's 10 orientation, i.e. they can be angled downwards with respect to a horizontal view. Second camera 20 and third camera 30 can be stereo cameras. They can be separated by a distance of 5-10 cm. The stereo cameras facilitate triangulation of objects by comparing the features present on the visual images from the stereo cameras.

A fourth camera 40 and a fifth camera 50 are placed on the left side of the robot's body 3 with respect to a forward direction of motion. The fourth camera 40 and the fifth camera 50 can also be stereo cameras. They can be separated by a distance of 15-20 cm.

On the right side of the robot's body with respect to the direction of motion, a sixth camera (not shown) and a seventh camera (not shown) are placed in a position that is complementary to positions of cameras 40 and 50. The sixth camera and the seventh camera can also be stereo cameras preferably separated by a distance of 15-20 cm.

On the back of the robot, an eighth camera (not shown) and a ninth camera 90 can be placed. The eighth camera and the ninth camera 90 can also be stereo cameras preferably separated by a distance of 5-10 cm. One or more cameras can be arranged in a portrait orientation. This means that the vertical viewing angle can be larger than the horizontal one. In the shown embodiment, the fourth through seventh side cameras can be placed in a portrait orientation. The other cameras (first through third, eighth and ninth) can be placed in a landscape orientation. This means that the horizontal viewing angle can be larger than the vertical one.

Figure 2:
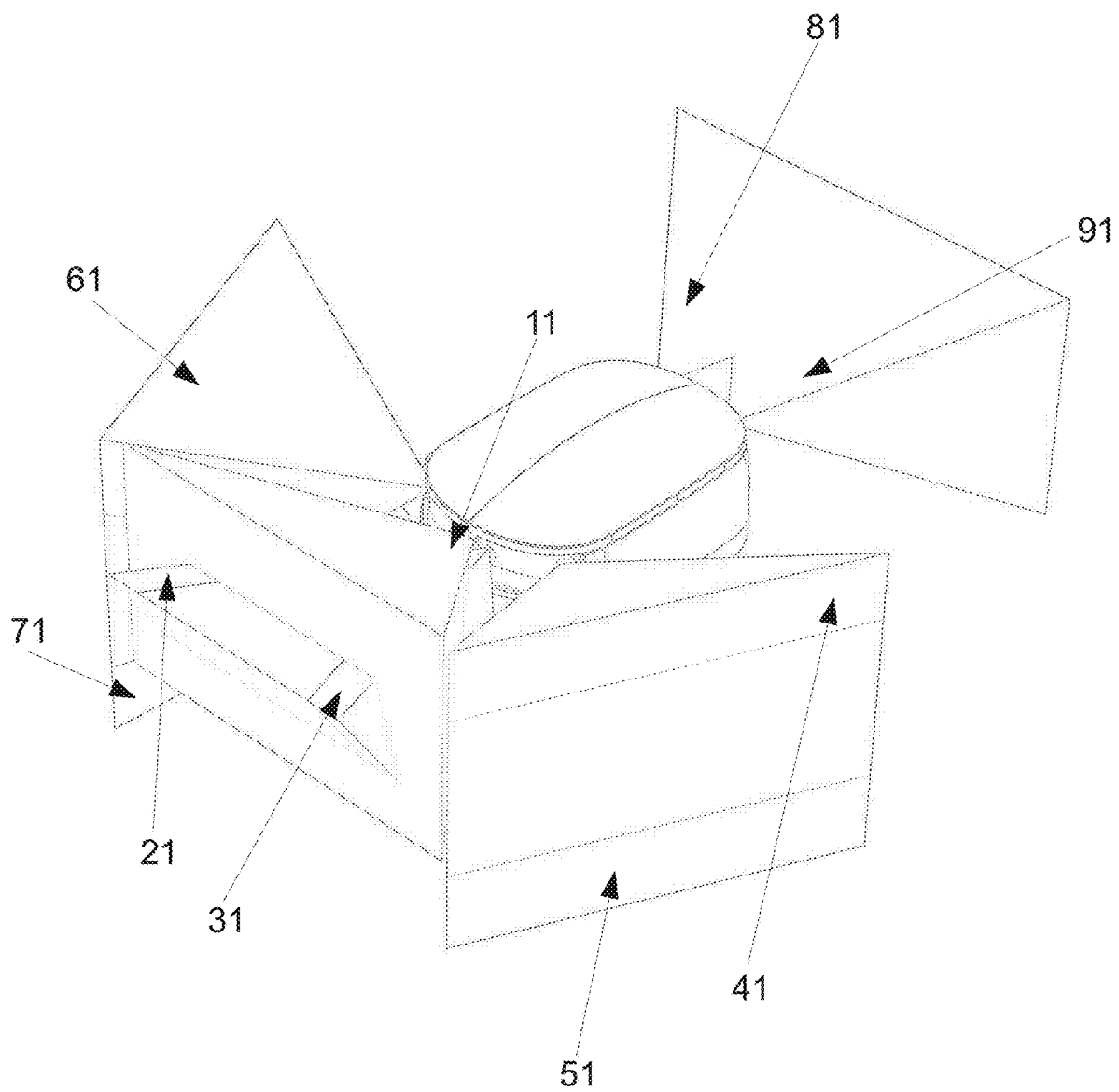
FIG. 2 shows an embodiment of different camera viewing angles.

FIG. 2 shows an embodiment of the robot according to the invention. FIG. 2 demonstrates viewing angles of a camera setup as shown in FIG. 1. All of the cameras' viewing angles are shown. The viewing angles can be in the range of 40-80° by 60-100°, preferably about 60° by 80°. The viewing angle 11 corresponds to the first camera 10. The viewing angles 21 and 31 correspond to the cameras 20 and 30 respectively. Those two cameras can be arranged in a stereo manner, which is why FIG. 2 demonstrates the viewing angles intersecting. A similar arrangement can be achieved with the eighth and ninth cameras—these can also be stereo cameras placed towards the back of the robot on its body 3. Therefore, viewing angles 81 and 91 corresponding to the eighth and ninth cameras, respectively, are also shown as intersecting. The two pairs of side cameras—one pair being the fourth and fifth cameras 40, 50 and the second pair being the sixth and seventh cameras (not shown) can be placed in a stereo position in a portrait orientation. Their corresponding viewing angles 41 and 51, and 61 and 71 respectively similarly intersect. The robot has cameras mounted thereon which point in different directions and whose viewing angles do not intersect, i.e., their fields of view are non-overlapping. For example, cameras 20 and 90 point in opposite directions (one forward and one rearward) and have non-overlapping fields of view.

Figure 3:
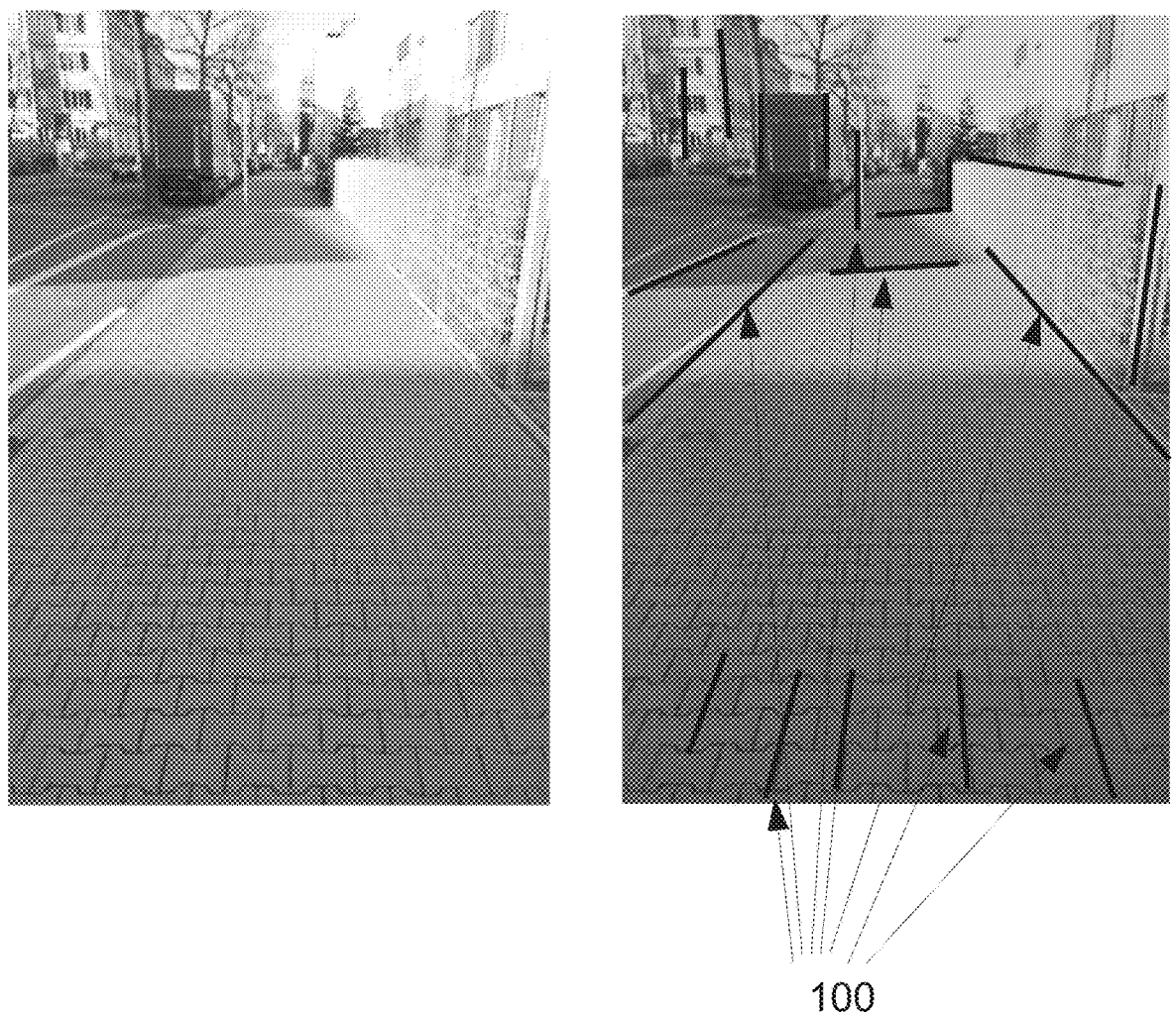
FIG. 3 shows an embodiment of straight lines extracted from an exemplary image using the described invention.

FIG. 3 shows an embodiment of straight lines 100 that can be extracted during the operation of the robot. Straight lines 100 can belong to permanent objects (such as houses, fences, sidewalks) and/or transitory objects (such as cars, shadows). The invention is adapted to be calibrated using multiple test cases of the images—improving its accuracy in detecting the lines and identifying the lines belonging to permanent objects.

Figure 3B:
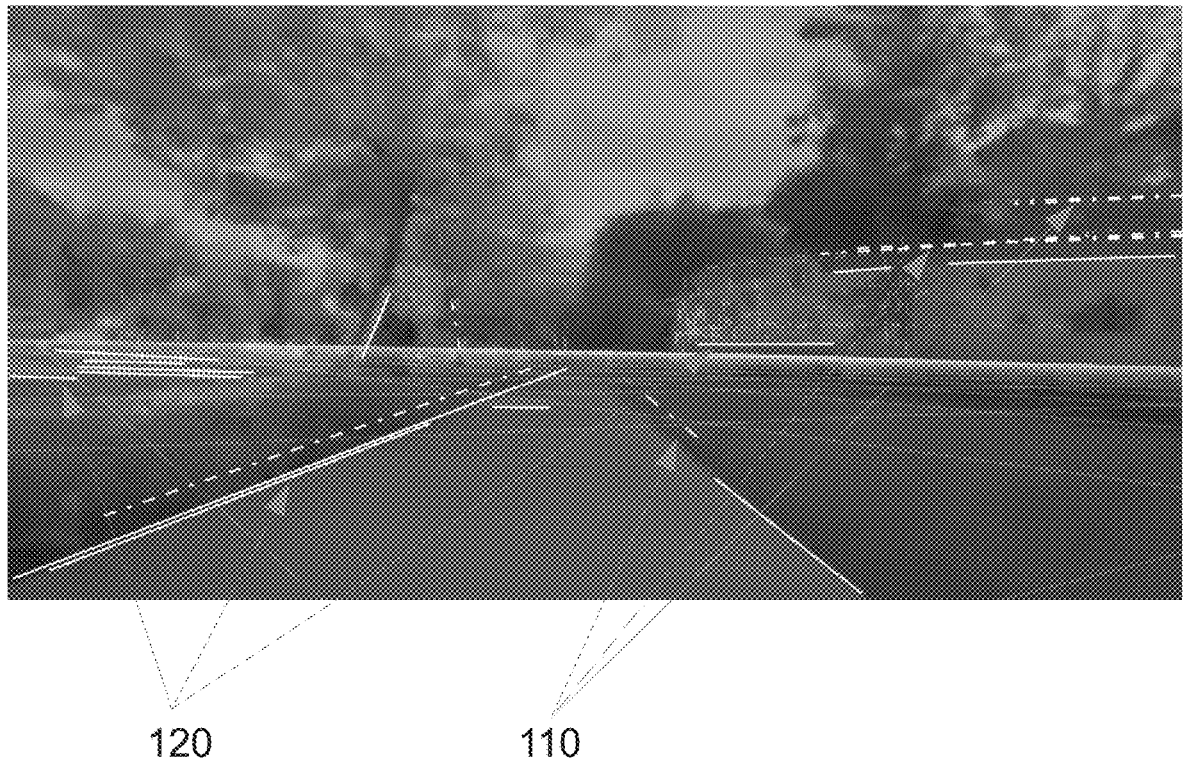
FIGS. 3b, 3c, and 3d depict an embodiment of localization according to the invention.
Figure 3C:
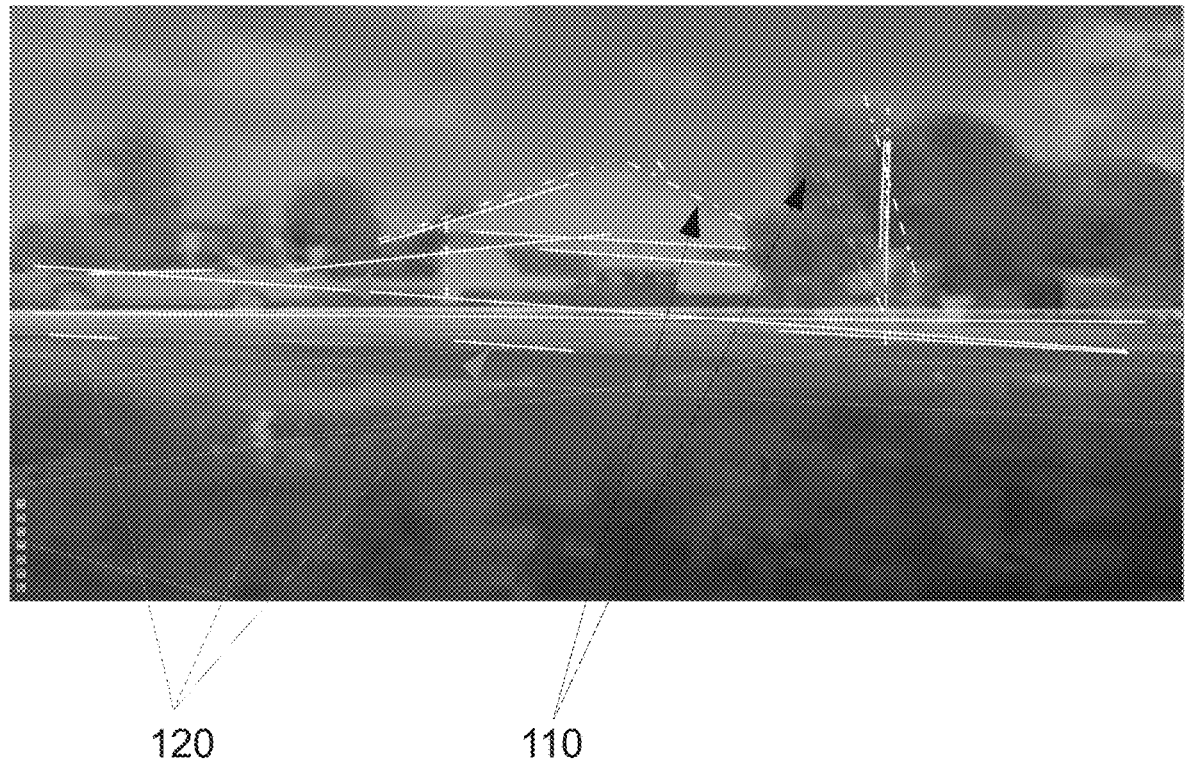
Figure 3D:
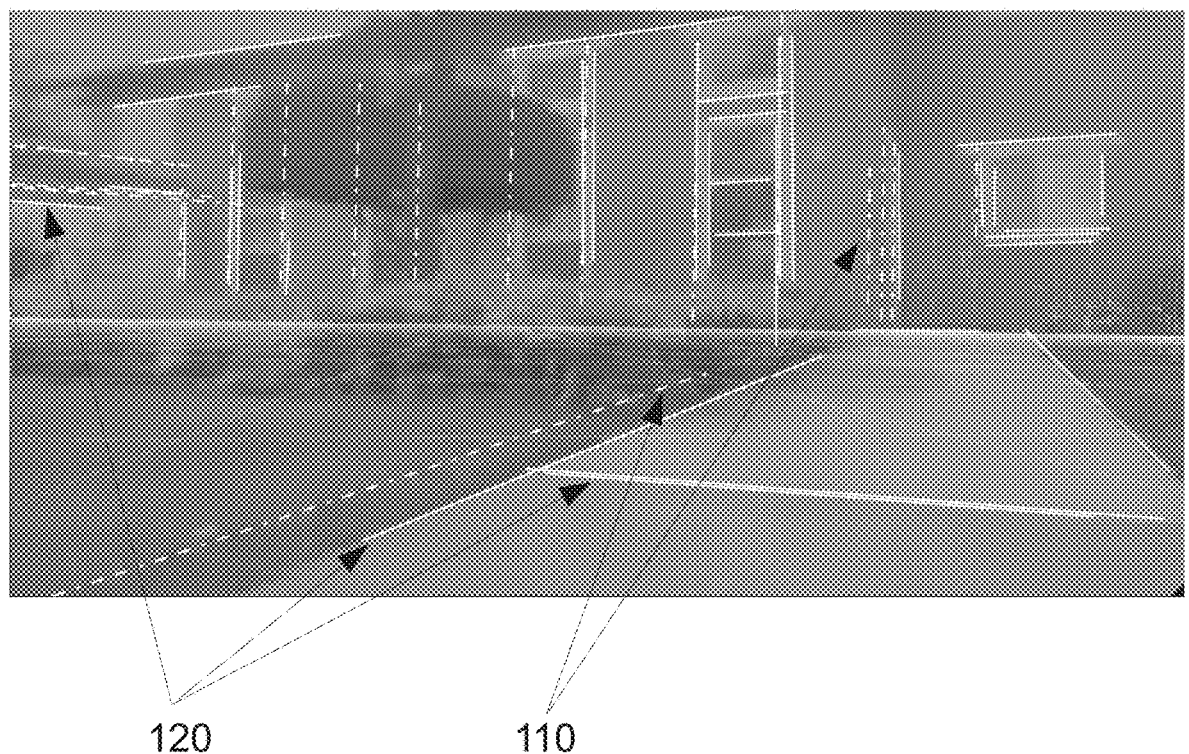

FIGS. 3b, 3c and 3d show exemplary camera images with the extracted lines superimposed. The figures depict two types of lines: dotted lines 110 and solid lines 120. Dotted lines 110 are the 3D lines that can belong to landmarks and that are stored within the map. Those lines can be obtained, for example, during a previous robot run as 2D lines from camera images and converted, for example by an iterative algorithm, to 3D landmarks. Solid lines 120 are 2D lines extracted from the camera images during a current robot run. The figures demonstrate a snapshot of a schematic representation of the robot localizing itself. The underlying optimization algorithm runs iteratively in order to identify the correct 2D lines 120 belonging to 3D landmarks 110. In this way, the robot's pose can be obtained from comparing the lines extracted from camera images to the lines stored in map data.

Figure 3E:
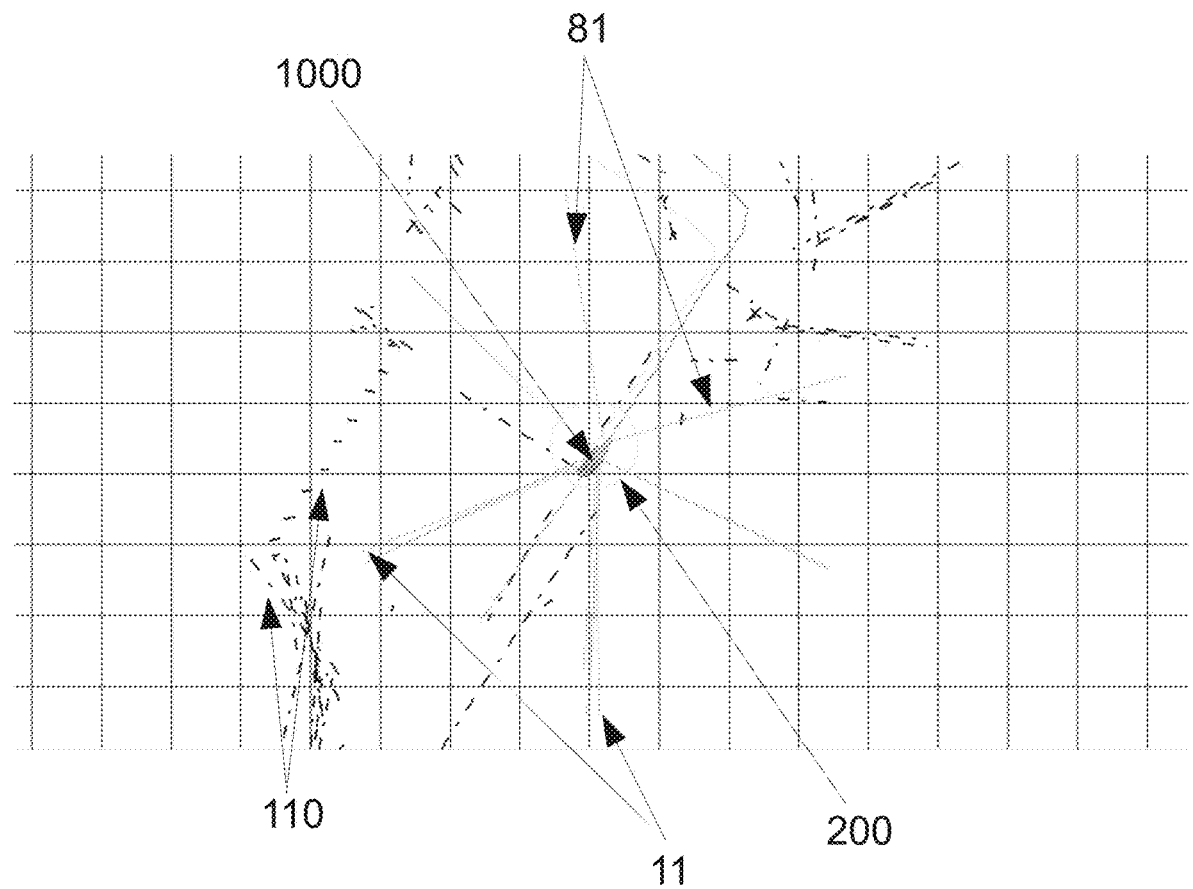
FIG. 3e depicts a schematic top view of the robot performing localization according to one aspect of the invention.

FIG. 3e depicts a schematic top view of a mobile robot 1000 performing localization on itself. The robot 1000 is shown in the middle as a black rectangle. Camera angles of the robot's 1000 cameras are also schematically shown. Front camera angle 11 can be seen to the lower left of the robot 1000. One of the back camera angles, 81 can be seen to the top right of the robot 1000. In this embodiment, only one back camera angles 81 is indicated. A schematic GPS sensor output is indicated by a circle 200. The circle 200 represents the robot's approximate position and can, for example, serve as a starting point for the localization procedure. In such embodiments, the localization algorithm can for example start with the GPS reading and then refine it using camera images-based localization. As before, dotted lines 110 indicate the 3D lines identifying various landmarks on the robot's map. Here they are depicted as a projection on the ground plane with respect to the robot 1000.

Figure 4:
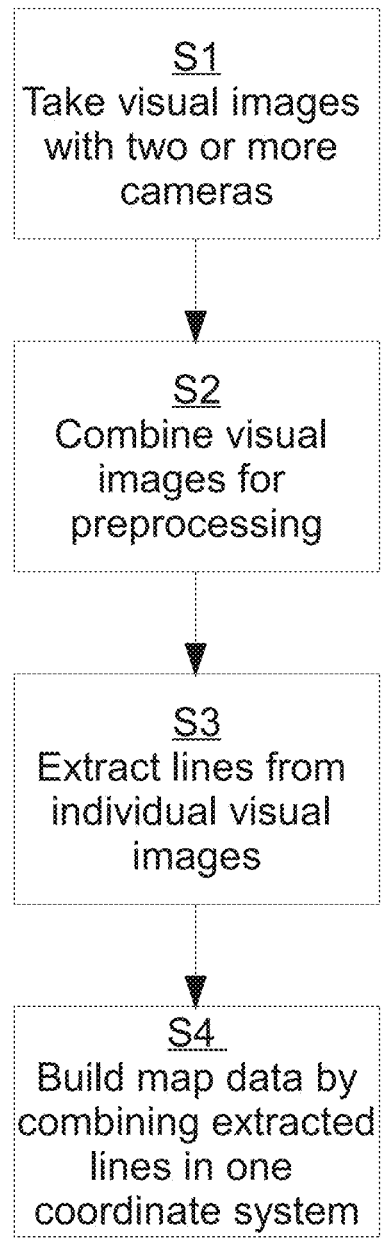
FIG. 4 shows a schematic description of an embodiment of a mapping method.

FIG. 4 shows an embodiment of a mapping method according to the invention. The first step S1 comprises taking visual images with the cameras placed on the robot. The visual images can be taken simultaneously. In a preferred embodiment, the robot comprises 9 (nine) cameras taking simultaneous images. The second step S2 comprises combining the visual images into one file for preprocessing. This step can be done to speed up the process. After the preprocessing, the combined file can be separated into the individual images again. The third step S3 comprises extracting lines from the individual images. This step can be done using first an edge detecting algorithm such as for example the Canny algorithm and then using a line extracting algorithm on the result of the edge detecting algorithm. The line extracting algorithm can for example be the Hough transform. The fourth step S4 comprises combining the extracted lines to build map data of the area the visual images were taken in.

The precise positions of the cameras on the robot and with respect to each other can be known, which enables combining the extracted lines in a coherent manner in one coordinate system. This coordinate system can be arbitrary, as long as it is consistent and can be converted into a standard system such as GPS coordinates. The method comprising steps S1, S2, S3, and S4 can be repeated every time a new set of visual images is taken by the cameras. In a preferred embodiment, this is repeated 1-10 times per second. The robot can thus build a consistent map data of its area of operation. If multiple robots are operating in one area of operation, they can exchange map data and update it when changes are detected. The robots can thus benefit from the map data taken by other robots. Map data of different operating areas can be combined into global map data comprising all of the operating areas of the robots.

Figure 5:
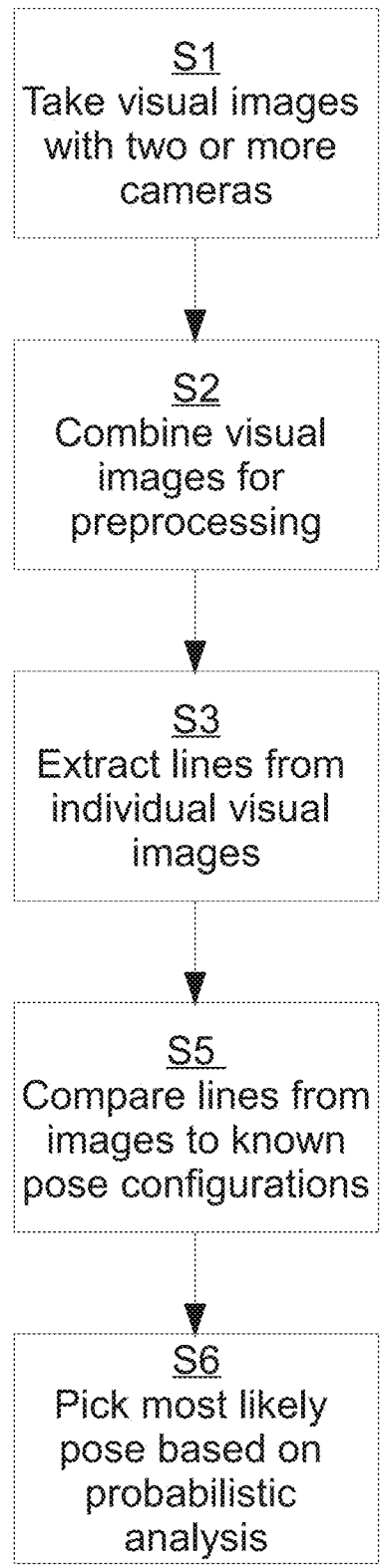
FIG. 5 shows a schematic description of an embodiment of a localization method.

FIG. 5 shows an embodiment of a localization method according to the invention. Steps S1, S2, and S3 can be the same as in the mapping method of FIG. 4. The localization method can be used when the robot comprises map data stored within its memory component. The fifth step S5 comprises comparing the straight lines extracted from the visual images (e.g., the aforementioned solid lines 120) to map data stored within the robot's memory component (e.g., the dotted lines 110). The map data stored within the memory component corresponds to different pose possibilities of the robot. The robot can then use a particle filter algorithm to evaluate the likelihood of each pose being the true one. In the sixth step S6 the most likely pose is picked based on the probabilistic analysis of known pose possibilities. This most likely pose will provide localization of the robot at the time the images are taken. The localization is rapid, and is typically complete within a very short timeframe, or at least before the next sets of images are processed (which can occur every 0.1 to 1 second).

If, for some reason, the robot is transiently unable to perform image-based localization, for example if the robot is unable to access or download a map to memory for performing localization during transit, the robot can navigate using other means of localizing that are also implemented on the robot (e.g., one or more of GPS coordinates, accelerometer data, gyroscope data, odometer data, magnetometer data, time of flight camera data and/or at Lidar data. Once the robot is able to resume image-based localization, its course can be readjusted if necessary, based on the more accurate localization data, taking into account its intended route of navigation.

Figure 6:
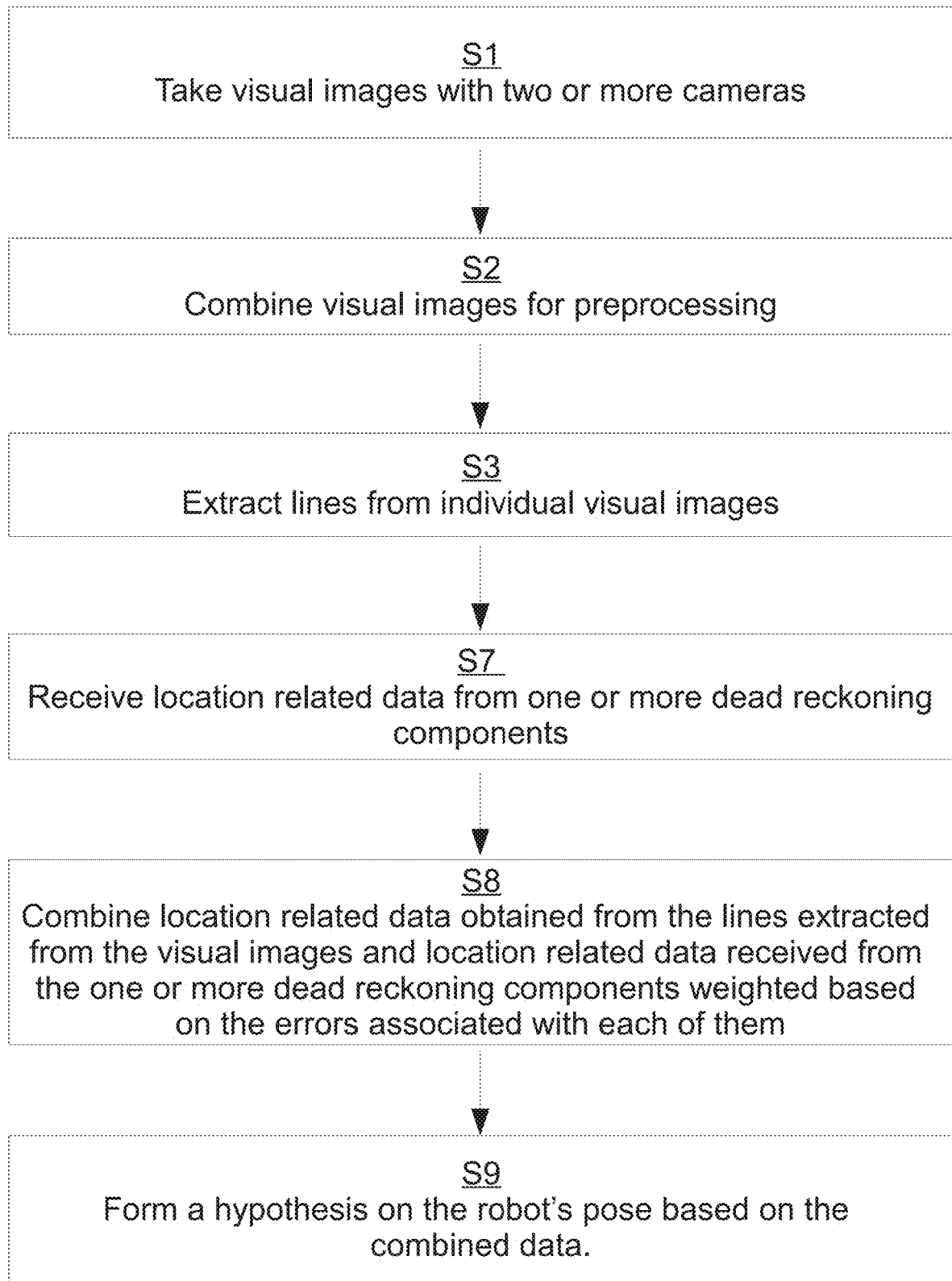
FIG. 6 shows an embodiment of a localization method according to the invention.

FIG. 6 shows an embodiment of a localization method according to the invention. Steps S1, S2, and S3 can be the same as in the mapping method of FIG. 4 and in the localization method of FIG. 5. The localization method can be used when the robot comprises map data stored within its memory component.

The seventh step S7 can comprise receiving location related data from one or more dead reckoning components. Those can comprise at least one odometer, at least one accelerometer, and/or at least one gyroscope. The eighth step S8 can comprise combining location related data obtained from the lines extracted from the visual images and location related data received from the one or more dead reckoning components weighted based on the errors associated with each of them. The ninth step S9 can comprise forming a hypothesis on the robot's pose based on the combined data. The last two steps can be performed using for example a particle filter algorithm as described above and below.

In one embodiment, the robot can receive location data each time step from the dead reckoning component. This location data can comprise an error estimate associated with it. Optimal time step duration can be determined by calibration. In a preferred embodiment, a time step can comprise 0.01-0.1 seconds, more preferably 0.01-0.05 seconds. The location data can be taken as a starting point for robot pose estimation at each time step. The dead reckoning component can comprise at least one odometer and/or at least one gyroscope. The dead reckoning component can then be a control sensor as described in the particle filter description.

The robot can further take visual images using at least two cameras. The robot's processing component can then extract features from the visual images. In a preferred embodiment, straight lines are extracted from the visual images and comprise location related data. The lines seen on a given image and/or a given combination of images can be compared with the lines that should be seen (based on the map) based on the given particle's pose. Quantitatively this can be represented as a probability of seeing the particular lines given the particle pose. This probability can be calculated approximately by a fitness function. It can be applied to the particle weights as described before. Normalization can be done to reduce correlations within a camera frame—one camera receiving many lines (like for example from a picket fence) should not dominate over another camera input that received only a few lines (that for example only saw a couple of building corners). This is furthermore done to keep the error estimate within a reasonable range (for numerical stability). In one embodiment, the fitness function does approximately the following: associating a line from a camera image with a line on the map, calculating the error between the two, summing up all the errors (for example using the square summed method), normalizing the sums across all of the images taken at a point in time, adding them up, and finally taking an exponential of the negative sum.

The processing component can then combine the data from the dead reckoning component and from the line based localization along with their respective errors to obtain an estimation of the possible robot poses. This can be done using the particle filter method. During this step, input from further sensors and/or components can be considered. For example, the robot can consider the location or pose related data yielded by a GPS component, a magnetometer, a time of flight camera, and/or an accelerometer.

At each time step, the robot can update the weight of all the particles within the particle filter and ends up with a distribution of likely robot poses. A resampling step can be done when a certain criterion is reached to make sure that the particle filter does not fail.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

What is claimed is:

1. A mobile robot configured to navigate outdoors on a sidewalk to deliver an item, the mobile robot comprising:
   a body and a space for holding an item for delivery while in transit,
   at least one memory component comprising existing map data, the existing map data comprising information reflective of straight lines extracted from past visual images which were previously taken in the robot's current operating area;
   at least two cameras mounted on the body and adapted to take new visual images, said at least two cameras pointing in different directions and having non-overlapping fields of view; and
   at least one processing component adapted to:
      extract new straight lines from the new visual images taken by the at least two cameras; and
      compare the extracted new straight lines to the existing map data and create localization data to localize the robot;
   wherein:
   the existing map data comprises straight lines belonging to buildings and/or fences and/or sidewalks, in said past visual images.

2. The mobile robot according to claim 1, wherein:
the robot has a width no greater than 70 cm, a height no greater than 70 cm and a length no greater than 80 cm.

3. The mobile robot according to claim 2, wherein:
the robot is adapted to travel with a speed of no more than 10 km/h.

4. The mobile robot according to claim 3, comprising an enclosed space within the body for holding an item to be delivered to a predetermined delivery location.

5. The mobile robot according to claim 1, comprising a first pair of stereo cameras mounted on a front of the body, second and third pairs of stereo cameras mounted on opposite sides of the body and a fourth pair of stereo cameras mounted on a back of the body.

6. The mobile robot according to claim 1, comprising
   at least 4 pairs of stereo cameras, members of each pair of stereo cameras located on the robot so as have overlapping fields of view and provide depth information.

7. The mobile robot according to claim 1, wherein:
   the at least one processing component is adapted to extract new straight lines and compare the extracted new straight lines with the existing map data, while the robot is in transit to said predetermined delivery location.

8. The mobile robot according to claim 1, wherein the processing component is adapted to localize the robot with an error of at most 10 cm.

9. The mobile robot according to claim 1, adapted to navigate using the localization data from the processing component.

10. The mobile robot according to claim 9, wherein the processing component is adapted to create localization data by:
obtaining an approximate location from at least one or more a GPS component, an accelerometer, a gyroscope, an odometer, a magnetometer, a pressure sensor, an ultrasonic sensor, a time of flight camera sensor, and a Lidar sensor; and
refining the approximate location based on processing features extracted from the new visual images.

11. The mobile robot according to claim 1, further comprising:
a communication component adapted to exchange image data and/or map data with one or more servers, the communication comprising one or more of a slot for a Subscriber Identity Module (SIM card), a modem and a network device.

12. The mobile robot according to claim 11, wherein the robot is further adapted to receive navigation instructions from the server at specific intervals and/or after requesting input.

13. The mobile robot according to claim 1, wherein the robot is adapted to move autonomously and/or semi-autonomously.

14. The mobile robot according to claim 1, wherein the processing component is adapted to localize the robot by executing an iterative algorithm estimating the robot's pose, said pose comprising a combination of position and orientation of the robot.

15. The mobile robot according to claim 14 wherein:
the existing map data corresponds to different pose possibilities of the robot; and
the iterative algorithm evaluates the likelihood of each pose being the true one.

16. The mobile robot according to claim 14, wherein:
the iterative algorithm is adapted to generate a hypothesis on the robot's pose by processing data from one or more of a camera, a GPS component, an odometer, a gyroscope, an accelerometer, a Lidar sensor, a time of flight camera, an ultrasonic sensor, a pressure sensor, a dead-reckoning sensor, and a magnetometer.

17. The mobile robot according to claim 16, wherein the processing component is adapted to:
receive input data from at least one camera and at least one other sensor;
weight the input data based on errors associated with the at least one camera and the at least one other sensor; and
generate an estimate of the robot's pose based at least in part on the weighted input data.

18. A mobile robot localization method for a mobile robot configured to navigate outdoors on a sidewalk to deliver an item, the method comprising:
(a) while the robot is moving, taking new visual images with at least two cameras mounted on the robot, the two cameras pointing in different directions and having non-overlapping fields of view;
(b) extracting new straight lines from the individual new visual images with at least one processing component;
(c) comparing the extracted straight lines with existing map data comprising information reflective of straight lines extracted from past visual images which were previously taken in the robot's current operating area; and
(d) outputting a location hypothesis based on the comparison in step (c);
wherein:
the existing map data comprises straight lines belonging to buildings and/or fences and/or sidewalks, in said past visual images.

19. The mobile robot localization method according to claim 18, further comprising:
outputting a robot pose using the outputted location hypothesis, the robot pose comprising a combination of position and orientation; and
navigating the robot using the outputted robot pose.

20. The mobile robot localization method according to claim 18, wherein the extracting step and/or the comparing step comprises executing an iterative algorithm to determine a best location hypothesis given the existing map data.

21. The mobile robot localization method according to claim 20, wherein the iterative algorithm estimates the robot's pose, said pose comprising a combination of position and orientation of the robot.

22. The mobile robot localization method according to claim 21, wherein:
the existing map data corresponds to different pose possibilities of the robot; and
the iterative algorithm evaluates the likelihood of each pose being the true one.

23. The mobile robot localization method according to claim 18, further comprising in step (d):
extracting second location related input data from one or more of a GPS component, an odometer, a gyroscope, an accelerometer, a Lidar sensor, a time of flight camera, an ultrasonic sensor, a pressure sensor, a dead-reckoning sensor, and a magnetometer; and
combining first location related data obtained from features extracted from the new visual images with the second location related data to form a more precise location hypothesis.

* * * * *